Dec. 19, 1950 M. WALLACE 2,534,840

RADIO SYSTEM FOR PROVIDING VERTICALLY SEPARATED AIRWAYS

Original Filed Sept. 21, 1940 8 Sheets-Sheet 1

INVENTOR.
Marcel Wallace
BY
Darby & Darby
Attorney

Dec. 19, 1950 M. WALLACE 2,534,840

RADIO SYSTEM FOR PROVIDING VERTICALLY SEPARATED AIRWAYS

Original Filed Sept. 21, 1940 8 Sheets-Sheet 2

Inventor
Marcel Wallace,
by
Darby & Darby
Attorney

INVENTOR.
Marcel Wallace
BY
Darby & Darby
Attorney

Inventor
Marcel Wallace
by
Darby & Darby
Attorney

Dec. 19, 1950 M. WALLACE 2,534,840

RADIO SYSTEM FOR PROVIDING VERTICALLY SEPARATED AIRWAYS

Original Filed Sept. 21, 1940 8 Sheets-Sheet 5

INVENTOR.
Marcel Wallace,
BY Darby & Darby
Attorney

INVENTOR.
Marcel Wallace,
BY
Darby & Darby
Attorney

Dec. 19, 1950

M. WALLACE 2,534,840

RADIO SYSTEM FOR PROVIDING VERTICALLY SEPARATED AIRWAYS

Original Filed Sept. 21, 1940

8 Sheets-Sheet 7

Inventor
Marcel Wallace
By Darby & Darby
Attorney

Dec. 19, 1950 M. WALLACE 2,534,840

RADIO SYSTEM FOR PROVIDING VERTICALLY SEPARATED AIRWAYS

Original Filed Sept. 21, 1940 8 Sheets-Sheet 8

INVENTOR.
Marcel Wallace,
BY
Darby & Darby
Attorney

Patented Dec. 19, 1950

2,534,840

UNITED STATES PATENT OFFICE 2,534,840

RADIO SYSTEM FOR PROVIDING VERTICALLY SEPARATED AIRWAYS

Marcel Wallace, New York, N. Y., assignor, by mesne assignments, of one-half to Panoramic Radio Corporation, New York, N. Y., a corporation of New York Original application September 21, 1940, Serial No. 357,814, now Patent No. 2,378,604, dated June 19, 1945. Divided and this application April 14, 1945, Serial No. 588,396

25 Claims. (Cl. 343—112)

Figure 1:
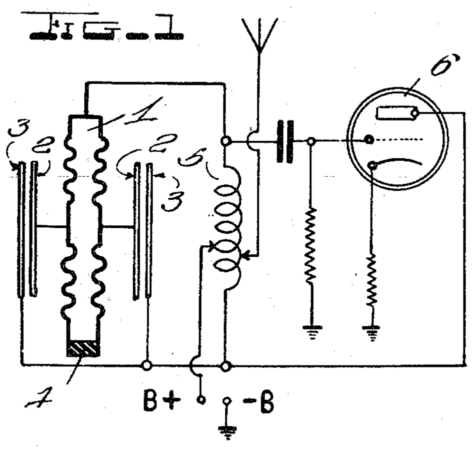

My invention relates broadly to systems of radio navigation and more particularly to improved methods and circuit arrangements for radio beacons and panoramic reception for use in navigation of mobile bodies.

This application is a division of my Patent No. 2,378,604, issued June 19, 1945, for Radio Altimeter and Panoramic Reception System.

In my Patents No. 2,279,151, granted April 7, 1942, for Panoramic Radio Receiving System, and No. 2,273,914, granted February 24, 1942, for Radio Navigation System, I have shown that by means of a frequency scanning panoramic receiver installed on board an airplane, it is possible to observe one or a plurality of signals which are radiated from transmitting stations located at danger points, such as mountain peaks, for warning the pilot of the approach of the plane to terrain which may be hazardous to aerial navigation.

One of the objects of my invention is to provide a system for emitting a signal of such a nature as to inform those who receive it, of the altitude of a fixed or mobile body equipped with the apparatus of my invention.

A further object of my invention is to provide an arrangement of a signal generator which can be synchronized with a receiver on board a mobile body, in such a manner that the signal supplied by the generator does not interfere with the reception of another signal at the same frequency originating from another body.

Another object of my invention is to provide simple apparatus for the reception and convenient interpretation of a plurality of signal indications, and information which can be received visually, or both visually and aurally.

A further object of my invention is to provide simple transmitting and receiving apparatus for providing navigational information without moving parts and with all the circuits electronically controlled.

A still further object of my invention is to provide a simple system for distinguishing between signals of a given system and others of another system although such beacons may use the same portion of the frequency spectrum, by changing the rate of frequency change from one system to the other. This is rendered possible by the use of frequency scanning panoramic receivers having means for varying at will their rate of frequency sweep, so as to make it correspond to the rate of frequency variation, or of a harmonic thereof, of a signal. This feature permits the elimination of sources of periodic noises such as produced by vibrators, motors, etc.

Another object of my invention is to provide means for traffic control at airports, and therefore permit handling of large numbers of aircraft during conditions of poor visibility.

Still another object of my invention is to provide an absolute altimeter control requiring no adjustments, along airways and airports.

Another object of my invention is to combine such altitude indications and traffic controlling system, with means for communication to selected stations.

Still another object of my invention is to provide means for signalling from the ground to particular aircraft selected according to their altitude.

Still another object of my invention is to permit aircraft to fly in different directions along such airways and maintain a certain minimum and maximum vertical separation between them.

Another object of my invention is to simplify methods of instrument landing by using the absolute altitude as indicated from the airport, as a vertical indication and to combine such indications with those of distance and direction.

Another object of my invention is to provide means for aircraft identification either from aircraft to aircraft or from ground to aircraft.

Figure 1A:
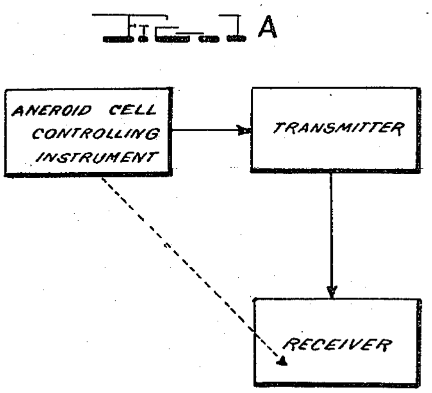
Figure 2:
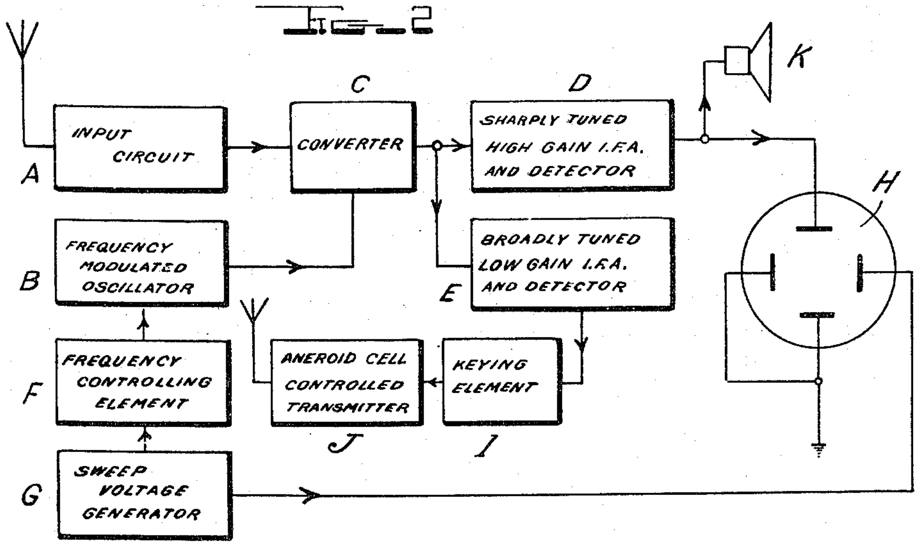
Figure 3:
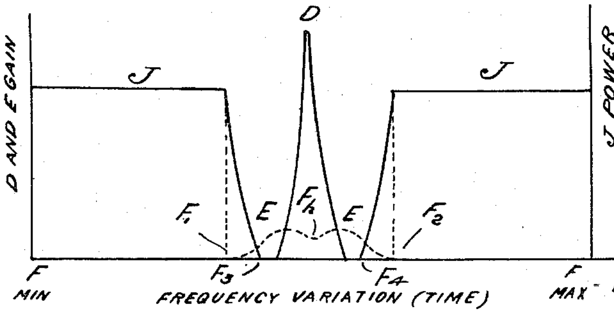
Figure 3A:
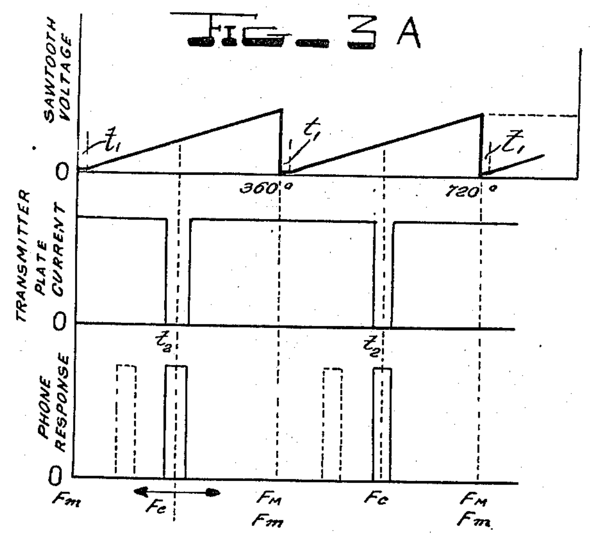
Figures 5, 14:
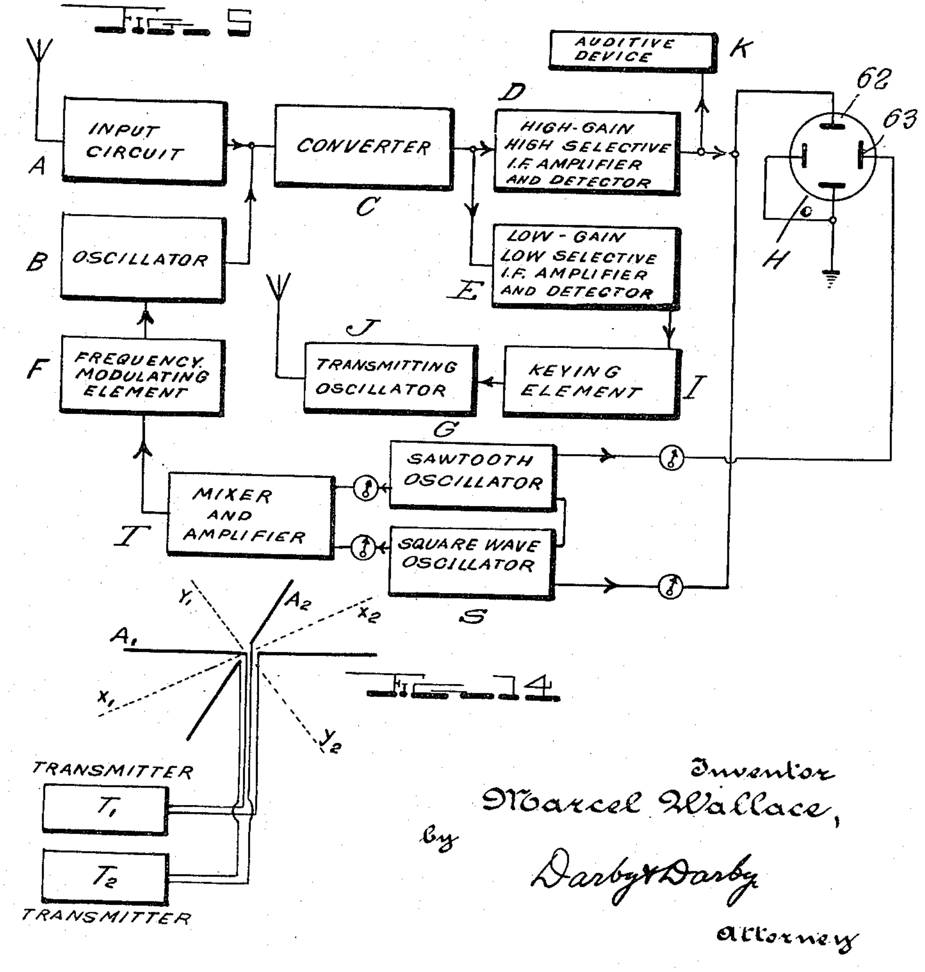
Figure 4:
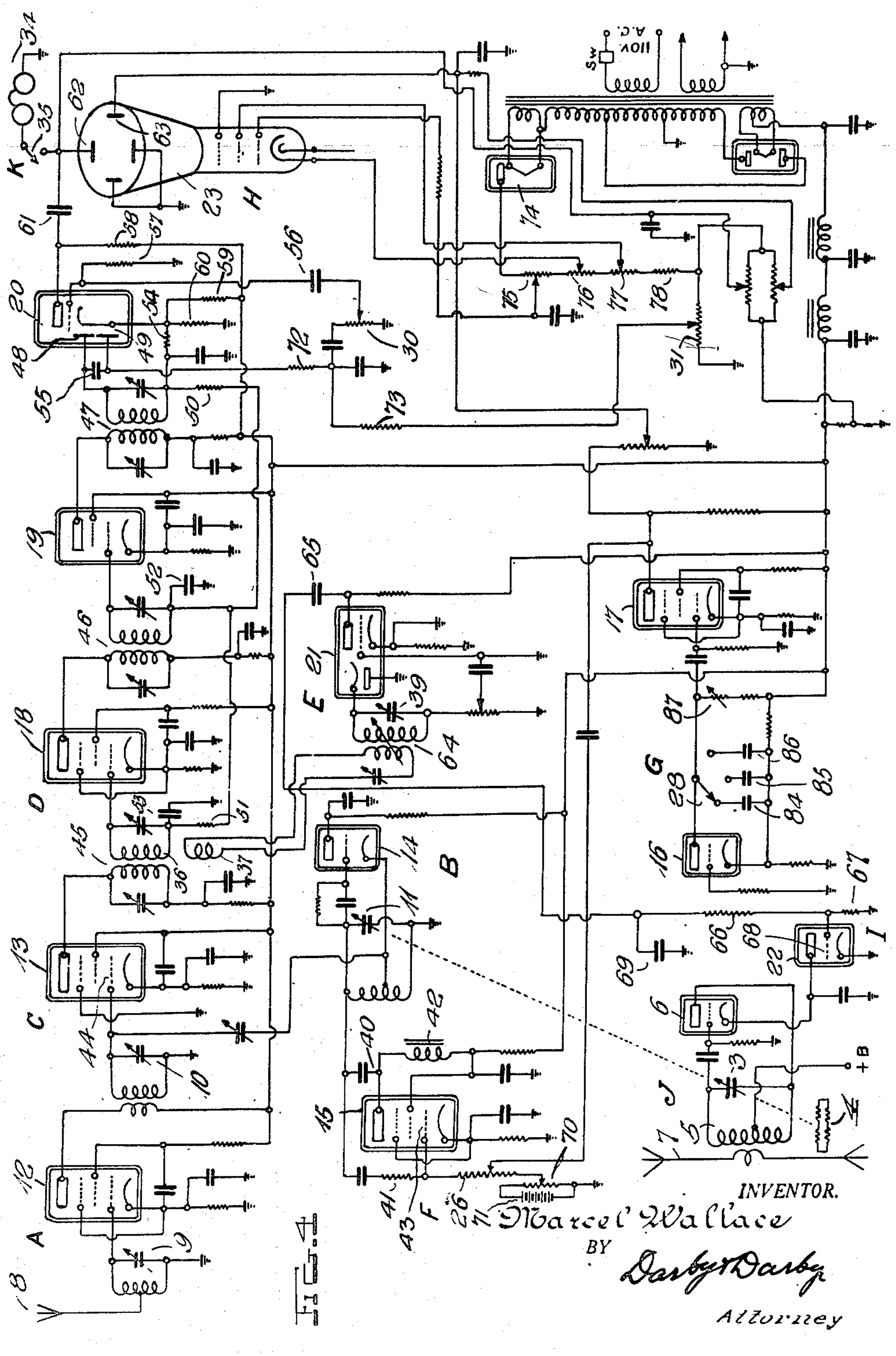
Figure 4A:
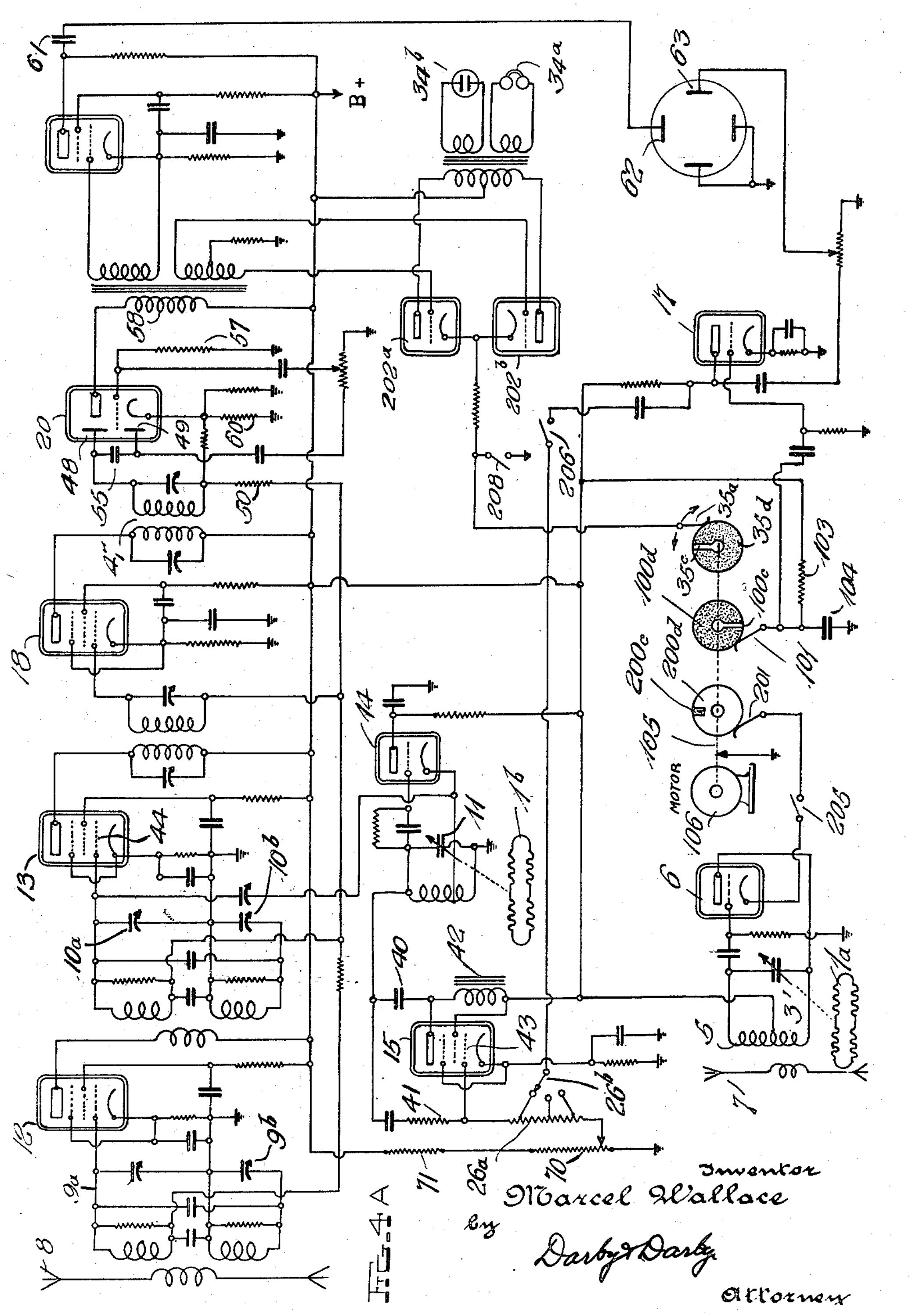
Figure 6:
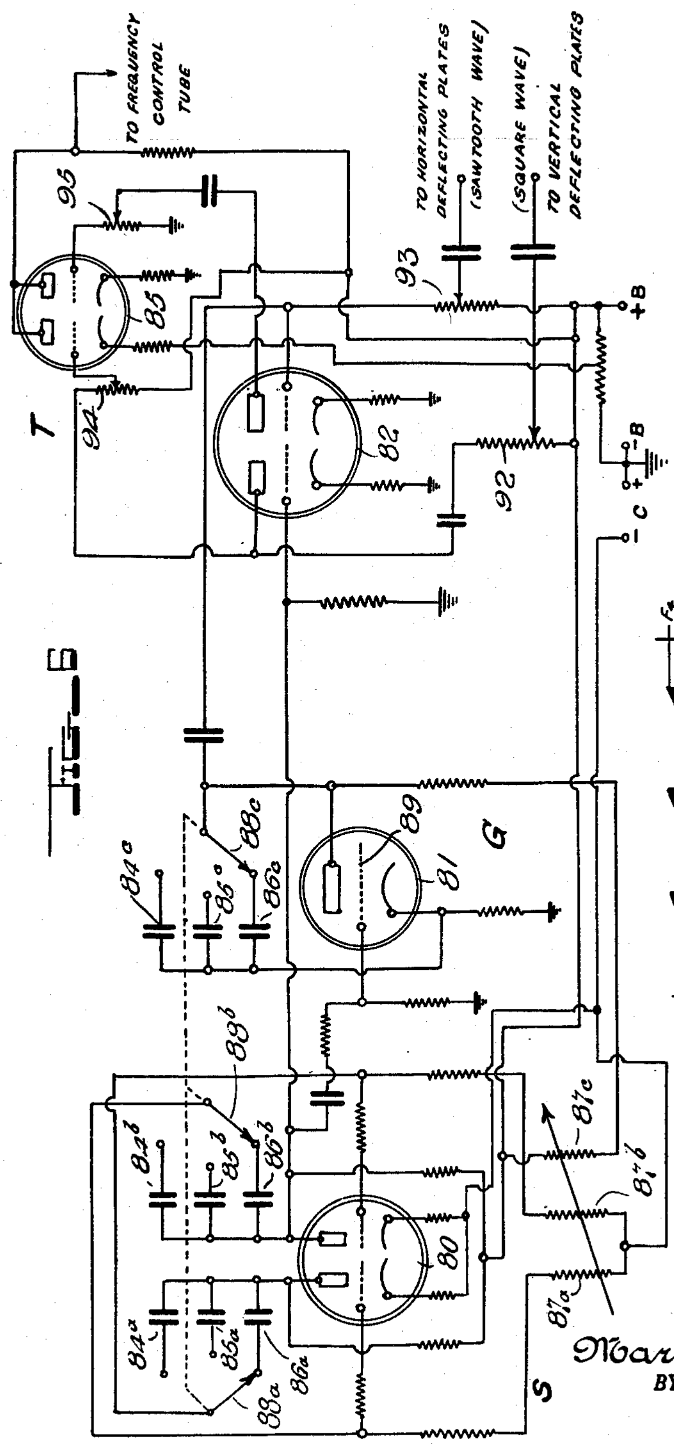
Figure 7:
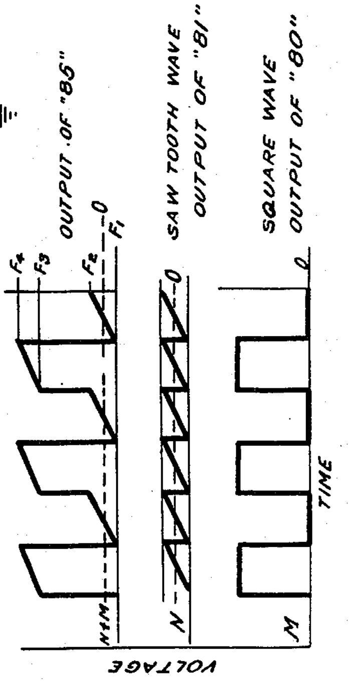
Figure 8:
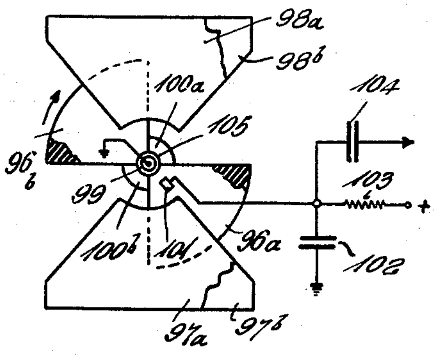
Figure 9:
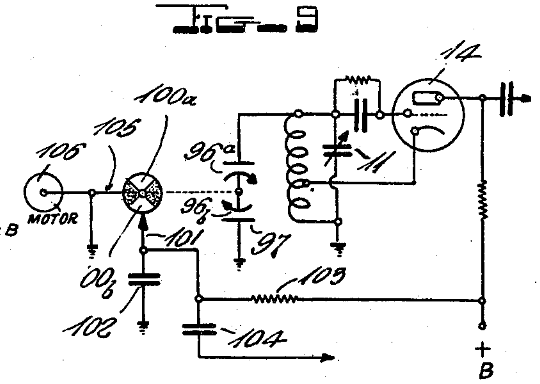
Figure 10:
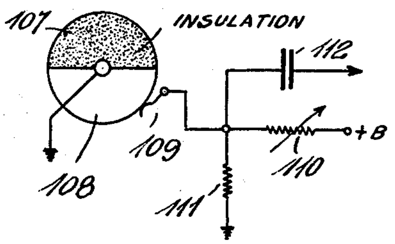
Figure 12:
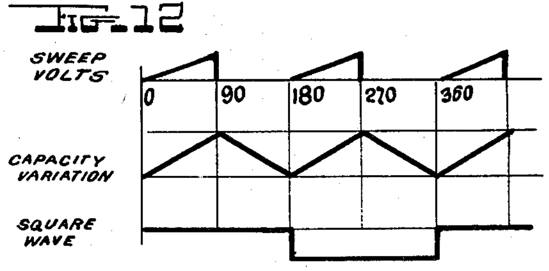
Figures 11, 13:
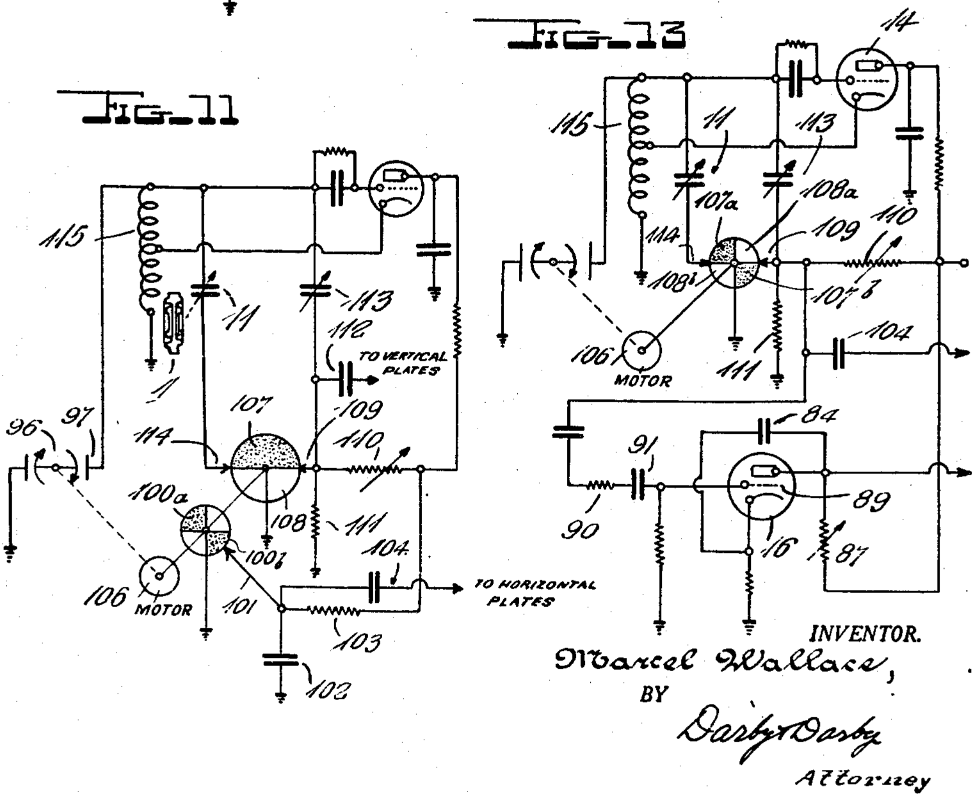
Figure 15:
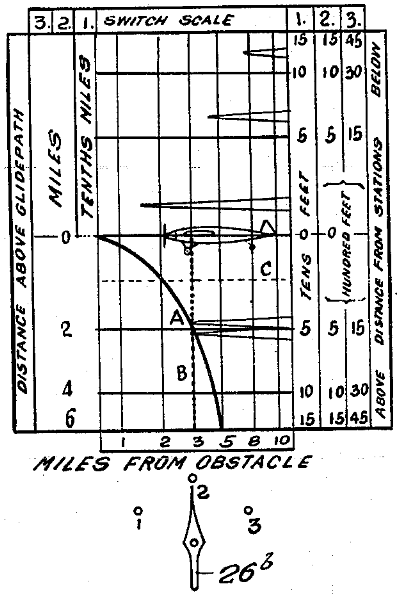
Figure 16:
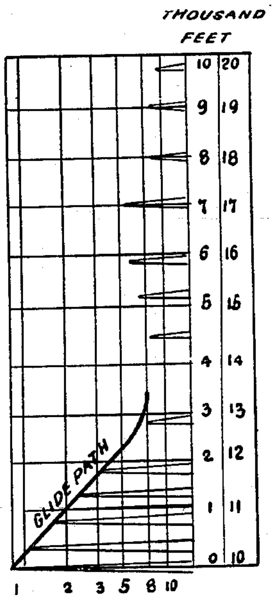
Figures 17, 18, 19, 20:
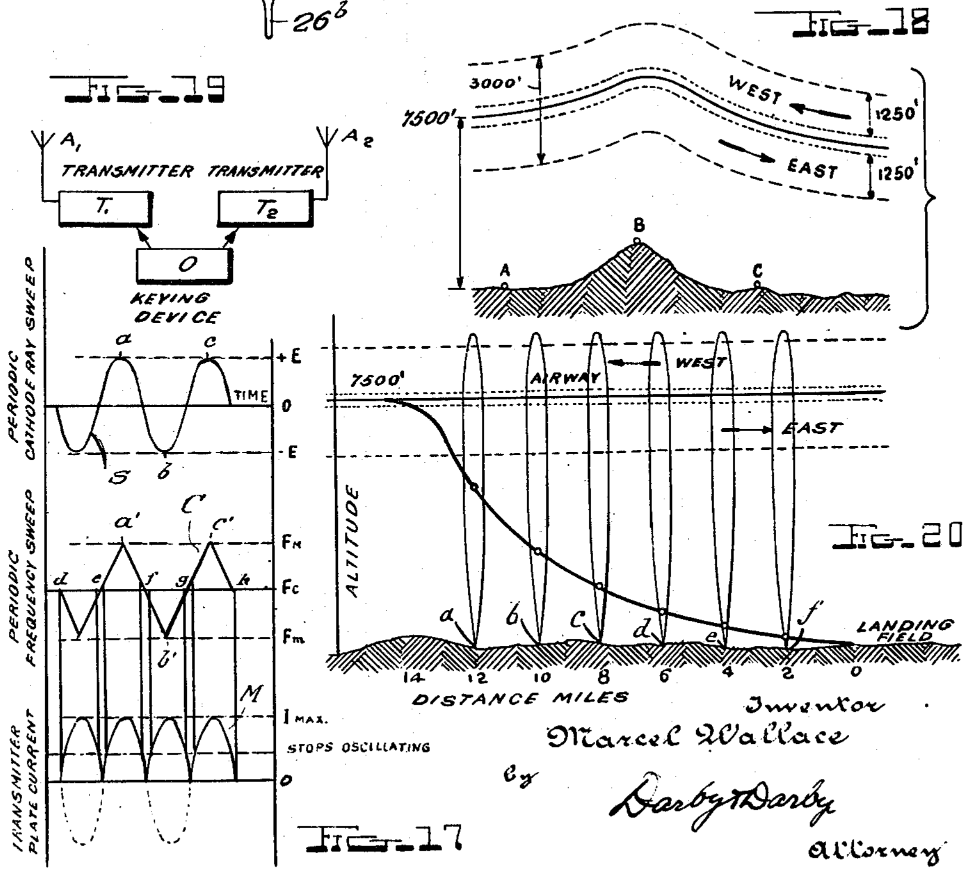
Figures 21, 22, 22A, 22B:
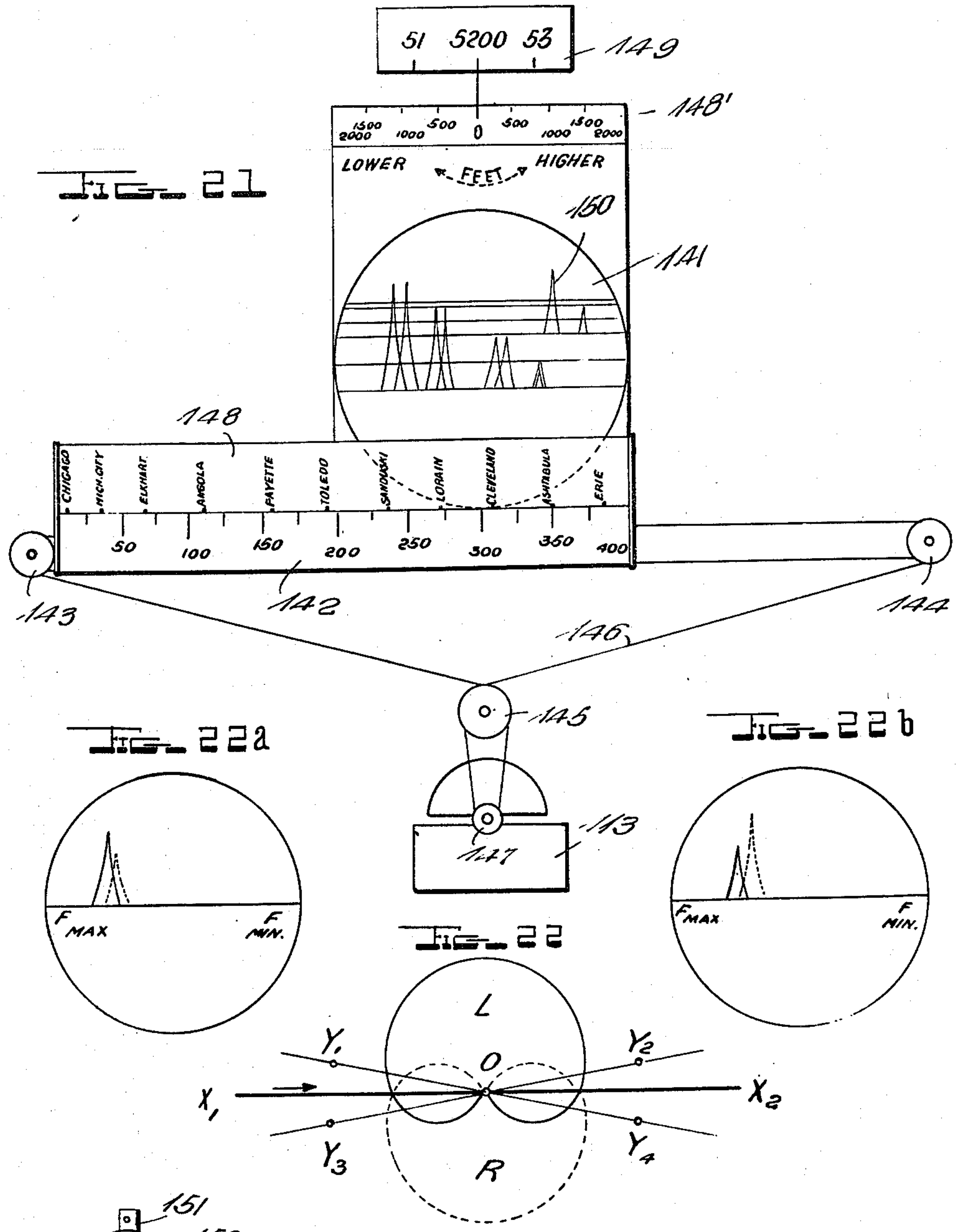
Figure 23:
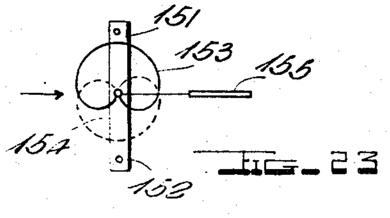

Other and further objects of my invention will be apparent from the specifications hereinafter following by reference to the accompanying drawings, in which:

Figure 1 is the diagram of an aneroid cell controlled transmitter used in my invention; Fig. 1*a* is a block diagram showing the relationships between an aneroid cell, a transmitter and a receiver according to my invention; Fig. 2 is another block diagram showing in a more detailed form the principal parts and their relationship in a fully electronically controlled frequency scanning panoramic receiver, and of an aneroid cell controlled transmitter, said receiver automatically keying off the transmitter so as to prevent interference between the two; Fig. 3 represents a series of curves showing the frequency versus gain and power relationships between the various elements shown in Figs. 2 and 4; Fig. 3*a* represents a series of curves showing the phase relationship between the sawtooth voltage controlling the periodic response of an aural device and the periodic keying of a transmitter as shown in Fig. 4*a*; Fig. 4 is a detailed diagram of a receiver such as represented in Fig. 2; Fig. 4*a* is a similar receiver combining electronic and mechanical means; Fig. 5 is a block diagram of another electronically controlled receiver and transmitter similar in function to those shown in Fig. 2, with the difference that the said receiver is simultaneously indicating signals present over distinct portions of the frequency spectrum; Fig. 6 shows details of the special elements used in connection with the apparatus shown in Fig. 5; Fig. 7 shows a series of curves explaining the time and voltage relationship of various elements of Fig. 5; Fig. 8 is a special dynamically balanced condenser combined with a synchronous commutator; Fig. 9 is a diagram of an apparatus in which the device of Fig. 8 is used; Fig. 10 shows a commutator and its connections for obtaining a square wave current; Fig. 11 is a schematic diagram showing a mechanically controlled frequency scanning panoramic receiver simultaneously indicating two bands of the frequency spectrum and using the devices shown on Figs. 8 and 10; Fig. 12 is a diagram explaining the phase relationship between elements of Fig. 11; Fig. 13 is a schematic diagram representing part of a panoramic receiver using an electronic source of sweep voltage, a mechanical commutator and a periodically tunable condenser. It also shows the method of synchronizing these elements; Fig. 14 represents a block diagram of the principles used in a dual-frequency beacon according to my invention, in which two transmitters are continuously operated; Fig. 15 represents a screen of an aircraft type receiver embodying the features of my invention; Fig. 16 represents the screen of a similar ground type receiver; Fig. 17 represents the phase relationship between a sine wave used for cathode ray sweep and transmitter modulation, and a pyramid wave for frequency sweep; Fig. 18 shows a vertically defined airway, with vertical separation for aircraft traveling in opposite directions; Fig. 19 is a block diagram of a simplified transmitter in which two oscillator-transmitters are alternately operated; Fig. 20 shows a series of vertical level markers leading planes to a landing runway from a vertically defined airway; Fig. 21 shows the appearance of the screen and dial arrangement of a dual band frequency scanning panoramic receiver, showing simultaneously a plurality of beacons, their geographic position and also a plurality of obstacles and their respective altitudes with respect to the observer; Fig. 22 is a reversible transmission pattern of a dual-frequency beacon creating an equi-signal path; Figures 22*a* and 22*b* show how certain signals transmitted from a transmission pattern such as shown in Figure 22 appear on a frequency scanning panoramic receiver; and Figure 23 is a diagram of a wind controlled directive beacon.

In the carrying out of my invention, advantage is taken of the properties of a frequency scanning panoramic receiver, such as described in my patents, supra.

In the system of my invention, I provide means capable of:

1. Continuously observing the variations of signal strength of two or more signals.

2. Observing the variations of frequency of two or more signals.

3. Determining the frequency of modulation of any signal, by synchronizing the band sweep frequency with the modulation of the transmitter.

Considering the large number of special terms required in connection with the technique of frequency scanning panoramic reception, and in order to avoid repetition of explanation, or misinterpretation of these terms, I shall refer in the description which follows to standardized terms whose definitions are given herein below:

A "panoramic receiver" is a radio receiver having means for reproducing on a cathode ray screen substantially simultaneously in the form of individual signs, the frequency and amplitude characteristics of a plurality of independent signals distributed over a given portion of the radio frequency spectrum. When the presentation is produced by frequency scanning, or periodic tuning of the radio receiver, the receiver is known as a "frequency scanning panoramic receiver."

By "signal strength" ($s$) is meant the input strength of a signal measured in microvolts at the antenna terminals.

The "frequency sweep axis" is the line traced on the screen of the cathode ray tube. Its "point of origin" corresponds to the point on that line where the luminous spot stops, when the sweep voltage applied to the deflecting elements passes through zero value.

The "amplitude axis" is the imaginary line normal to the frequency sweep axis and meeting it at the point of origin.

"Frequency sweep rate" is the number of times the frequency scanning panoramic receiver is periodically tuned during an interval of one second.

The "deflection amplitude" ($v$) is the linear deflection produced by a signal, measured on the amplitude axis.

"Amplitude discrimination," for a given gain control setting, is the ratio $dv/ds$ between the increase of deflection amplitude ($dv$) and the increase of signal strength producing it ($ds$). It is a linear amplitude discrimination when the amplitude discrimination remains constant for any value of signal strength $$\left(\frac{dv}{ds}=\frac{v}{s}\right)$$

It is a non-linear amplitude discrimination when the amplitude discrimination varies with variations of signal strength, $$\frac{dv}{ds}=f(s)$$

The "logarithmic amplitude discrimination" is a non-linear amplitude discrimination in which $f(s)$ is a logarithmic function.

The "visual frequency range" is represented by the minimum frequency $F_m$ and maximum frequency $F_M$ corresponding to the extremities of the frequency sweep axis.

The "frequency sweep" is the difference between $F_M$ and $F_m$ and represents the bandwidth visually covered.

The "frequency spacing" is the band width representing in kilocycles, covered over one linear unit along the frequency sweep axis. It is expressed, for example, in "kilocycles per mm."

The "origin frequency" is the frequency at which the receiver is tuned at the point of origin on the frequency sweep axis.

The "center frequency" is that frequency which is substantially equally separated from $F_M$ and $F_m$ and is, therefore, in the center of the visual frequency range.

"Tuning" a panoramic receiver, is the action of displacing the origin or center frequency along the frequency spectrum.

"Tuning range" is represented by the minimum and maximum frequencies receivable (in kilocycles) by tuning the panoramic receiver from one end of a band to the other, ($F_{min}$ and $F_{max}$).

"Frequency range" is the number of kilocycles resulting from the difference between $F_{max}$ and $F_{min}$.

"Bias tuning" is the panoramic tuning obtained through the variation of biasing voltage on the reactor tube.

In order to explain the operation of my invention I must first refer to some well known principles involving the generation of a signal whose frequency is characteristic of the altitude or of the local pressure. A portion of the frequency spectrum may be assigned for the purpose of these indications, and may be subdivided according to a predetermined relationship between frequency and altitude. This relationship may be linear. For example, if for altitude zero, (corresponding to sea level) the frequency $F_{min}$ is assigned and for an altitude of H feet, a frequency $F_{max}$ is allotted, any intermediary altitude, for example $h$, can conveniently correspond to a frequency $$F_h = F_{min} + \frac{h(F_{max} - F_{min})}{H}$$

This term will be called in the future: the "altitude frequency" corresponding to altitude $h$.

Instead of this simple linear frequency versus altitude distribution, other functions may be determined, which instead of being linear, can be, for example, exponential, the frequency varying proportionally to the percentage of altitude variation, etc. An element such as an altitude or pressure operated instrument is employed for controlling the frequency determining circuit of the signal generator.

Such a generator is shown in Fig. 1, in which an aneroid cell 1, supported by block 4, is made to vary the distance between condenser plates 2 and 3. The capacity of the condenser 2—3 varies according to the local pressure as impressed upon the aneroid cell. This condenser operates to tune a circuit including an inductance 5 and the whole tuned circuit determines the frequency of oscillation of a tube 6. This is a simple type of local pressure of altitude indicating oscillator, which is employed in several arrangements of my invention described hereinafter.

The readings of the frequency indications of several such oscillators, may be made with a panoramic receiver, or by a frequency scanning panoramic receiver, such as described in my patents, supra. The frequency sweep axis on the cathode ray tube can be calibrated in altitude, and from the position of each deflection, the altitude of each obstacle can be read.

When such an altitude indicating signal generator is mounted on board aircraft and if this aircraft carries on board a panoramic receiver which tunes in the altitude band of the frequency spectrum, the locally generated signal covers that part of the spectrum which corresponds to its own altitude frequency. If another aircraft equipped with an identical altitude indicating signal generator is in the proximity of the first, and at the same altitude, the observer may not be able, therefore, to distinguish its signal, on account of said local signal which interferes with the other signal presumably weaker.

My present invention removes this difficulty. In order to do this, I provide a combination between the local signal generator and the panoramic receiver, in such a manner that the output power of the first is controlled in synchronism with the periodic tuning of the other. By means of a synchronous switch, which can be either electronic (Figs. 2, 3, 4) or mechanical (Figs. 3$a$, 4$a$), the transmitter is shut off entirely, or only reduced in power, periodically, every time the receiver tunes through, or must indicate a frequency close to that of the local transmitter.

Such a combination is represented as a block diagram in Fig. 1$a$.

I call such a combination between a panoramic receiver and an aneroid cell controlled transmitter, which operate in synchronism with one another a "Stratoscope," a word which will be used from time to time to define this instrument.

An electronically controlled stratoscope is shown in Fig. 2 in the form of a block diagram for explaining my invention. The frequency scanning panoramic receiver illustrated consists of a signal input circuit A, an oscillator B, a converter C and two channels of intermediate frequency amplifiers D and E. The oscillator is periodically tuned over a band of frequencies by a variable reactance tube F which, in turn, is controlled by a sweep voltage generator G. This generator produces the source of sweep voltage applied to one set of deflecting plates of the cathode ray tube H. The intermediate frequency channel D is sharply tuned and the signals passing through it are detected and applied to the other set of deflecting plates of the cathode ray tube.

The parallel channel E is broadly tuned or tuned slightly off the frequency of channel D and develops at its peak a much weaker signal than channel D. However, over certain portions of the frequency spectrum, immediately adjacent to the band pass characteristics of the channel D, it develops a stronger signal.

This is illustrated in Fig. 3, in which the abscissa represents the frequency variation (or time variation, the two being linked together) and the ordinate represents gain of channels D and E or power developed by oscillator transmitter J.

Supposing that the oscillator transmitter J emits a signal on frequency $F_h$ and the frequency scanning panoramic receiver starts tuning from a frequency $F_{min}$ toward a frequency $F_{max}$. As it approaches frequency $F_h$ it passes through a region $F_1F_2$ when the I. F. channel E develops an impulse which is applied at once to a keying tube which triggers off the transmitter J (see curve J on Fig. 3), before or almost at the time when the channel D could start building up a signal from the transmitter. The time constants of the trigger circuit are such as to maintain the transmitter keyed off during the predetermined time interval, equivalent to a variation of frequency of from $F_3$ to $F_4$. When the oscillator starts again, its frequency is out of the tuning range of the receiver, so that the latter is unaffected by the presence of that local signal. The signals picked up by the channel D are detected, amplified and applied to the other set of deflecting plates of the cathode ray tube H. These signals will be always synchronized with the sweep applied to the first set of deflecting plates, so that each deflection will appear stationary, in a position determined by the frequency of the signal and of an amplitude determined by the signal strength.

In parallel with the cathode ray tube, preferably through a proper coupling device, it is possible to feed an audible device such as a loudspeaker or head-phones, or a special visual device such as a neon bulb, etc. Such devices are illustrated in Fig. 4$a$, as 34$a$ and 34$b$. This is important in case of collision warnings. The speed of the planes being great, it is possible that the pilot may not be aware of the appearance of a visual danger signal on the screen, but his attention would be drawn at once if this signal will produce a distinctive noise in the loud-speaker or a light on the panel, which is exactly what happens. This is a very important feature of my invention, which adds to the safety of the flier.

In the circuit diagram of Fig. 4, the input circuit A is constituted by a receiving antenna 8, an inductance tuned by condenser 9 and an amplifier tube 12. The frequency modulated oscillator B is constituted by the triode 14 and a circuit tuned by condenser 11. Directly connected to the tuned circuit of this oscillator, I show the frequency modulating channel F constituted by a thermionic tube 15 which acts as a reactance in parallel with said tuned circuit. By properly adjusting the phase relationship between the input and output circuits of tube 15, as determined by capacities, resistors and choke (40, 41, 42) the reactance of this tube will increase or decrease the frequency of the oscillator 14 by an amount depending on the voltage impressed on the grid 43 of the tube 15 in a direction depending on its polarity.

An alternating voltage, preferably produced by a sawtooth oscillator 16 and amplified by tube 17 (corresponding to G in the block diagram) is fed to the variable reactance tube 15, through a potentiometer 26 and a voltage balancing potentiometer 70 which is shunted by a battery 71. The adjustment of potentiometer 70 controls the biasing voltage on the grid 43, consequently the average reactance value of the tube 15. It determines, therefore, the average frequency at which the receiver will operate when an alternating voltage is fed on the grid 43. The potentiometer 26 controls the amplitude of this voltage, which in turn controls the reactance variation of tube 15, and, therefore, the bandwidth of oscillator 14. The frequency of the sweep voltage can be adjusted by means of a multi-position selector switch 28 and the plate voltage controlling rheostat 87. This frequency can be tied up or synchronized to any desired periodic voltage source, such as power supply, etc.

The converter corresponding to C is tube 13 whose grid 44 is coupled to the input amplifier tube 12 and frequency modulated oscillator 14. The converted signal is developed in the I. F. transformer 45 having two secondaries shown at 36 and 37. The secondary 36 is tuned to the same frequency as the primary of transformer 45 and feeds the high gain, sharply tuned channel corresponding to D, composed of two amplifying stages comprising the tubes 18 and 19 and transformers 46 and 47.

The signals are then detected and reamplified by means of a combined diode-triode thermionic tube 20. One diode plate 48 applies the rectified signal to a resistor 54 and the voltage drop through it is used to automatically control the gain of the amplifying tubes 18 and 19 by applying appropriate voltages at their grids through resistors 50 and 51, which are by-passed with condensers 52 and 53. The action of this automatic volume control is very important in the operation of the system of my invention, because it will prevent a signal from building up in amplitude beyond a given point, and instead, will compress the other signals weaker than it, so as to maintain their amplitudes as indications of their field strength. It will also tend to equalize rapid variations of deflection amplitudes due to variaof signal strength caused by reflections.

The time constant of the circuits must be longer than the time period in which the receiver is tuned from minimum to maximum so that a signal impulse received in one tuning cycle will exert its volume control action in the next tuning cycle or cycles. Its action may be amplified if desired and this action actually determines the deflection amplitude of the receiver and its amplitude discrimination. Without this A. V. C. this amplitude discrimination is linear and with A. V. C. it is logarithmic. It is therefore possible to determine the ratio between various signal strengths by the difference between their corresponding deflections.

The other diode plate 49 is connected to the diode 48 by means of a condenser 55 and develops a rectified pulsating current which is applied to an amplitude controlling potentiometer 30 and from there through a condenser 56 to the grid of the triode section of the tube, which acts as a low frequency amplifier of the pulsating current.

A potentiometer 31 is provided for the important function of "thresholding" the signals. This operates as follows: The diode plate 49 of the diode-triode tube 20 is returned to the power supply circuit by means of resistors 72 and 73 to this potentiometer 31 a leg of which is at ground potential. The anode potential is taken from the cathode ray elements power supply 74 which is dropped to ground potential through a series of resistors including 75, 76, 77 and 78, some of which act as focus and intensity controls for said cathode ray tube.

By being able to make the diode plate 49 of any potential desired from zero up to a few hundred volts negative, it is possible to cut out or prevent detection of any signal which does not exceed a desired value. This control acts, consequently, as an adjustable threshold device, which is useful for eliminating either noises which are below the signal levels or weak signals which are not interesting to the observer and which may confuse him. This threshold potentiometer can be calibrated in field strength, whether microvolts or decibels for measuring the field strength of any signal. It is therefore useful also for measuring the difference between deflection amplitudes, which as said above, corresponds to ratio between signal strengths.

The potentiometer 30 which controls the amplitude of the signals applied to the output device, will cut all deflections in such a manner as to reduce them all in the same proportion. Therefore, the deflection ratios remain constant. By using, however, the threshold control we change the ratio between the deflection amplitudes and this becomes useful when we want to exaggerate or emphasize the difference of two deflections nearly equal in amplitude, as is necessary in the dual-frequency beacons described hereinafter.

The pulses resulting from the reception of a series of stations are of extremely short duration, this depending upon the frequency of the sweep-voltage, the band-width and selectivity of the I. F. stages. This means that the amplifier must have certain frequency characteristics which permit the amplification of frequencies of the order of a few thousand cycles per second. These frequency characteristics are determined by the values of the grid, plate and cathode resistors 57, 58, 60. A resistor 59 connected to the high voltage source maintains the exact bias required under conditions of varying load. The amplified pulses are applied through a condenser 61 to one deflecting plate 62 of the cathode ray tube 23, but it can also be connected by means of a switch 35 to an auditive output stage or device 34 for the audible or additional visual warning. The perpendicular deflecting plate 63 of the cathode ray tube is connected to the sweep voltage generator 16 after amplifying its output through tube 17. The frequency of this sweep should be sufficiently high to produce a rapid sweep of the cathode ray beam, which should appear substantially flickerless on the fluorescent screen of the cathode ray tube.

The secondary 37 of I. F. transformer 45 feeds the transformer 64 which is connected to a diode detector and amplifier tube 21 which corresponds to the amplifying channel E of Fig. 2. A very strong signal produces across the condenser 65 and resistor 66 a substantial negative voltage which is applied to the grid 68 of a keying or trigger tube 22 (corresponding to I). The plate of this tube is connected to the cathode of the transmitter oscillator tube 6 whose frequency is controlled, as explained hereinbefore, by the variations of pressure as impressed upon aneroid cell 1.

The tube 22 offers the proper amount of resistance in the cathode lead of the oscillator 6 when no signal is applied to the grid 68, which is returned to ground by the grid resistor 67.

The signal, however, builds upon the condenser 69 and grid 68 a negative voltage which triggers off the plate current of tube 6 which stays shut off until the charge of condenser 69 leaks out through resistors 66 and 67.

The time constants of this circuit can be adjusted to keep the transmitter turned off just the length of time desired, as explained hereinafter.

The voltage developed by the tube 21 is low even when signals originating at a certain distance are present, but is great in the presence of the local signal, which builds up to several hundred thousand micro-volts in that stage, before the sharply tuned stages 18, 19 have time to build a substantial signal. A variable coupling between the primary and secondary of transformer 64 permits the proper adjustment of the cut-off of the local transmitter. The tuning of this primary and secondary is such as to make it act as a filter of broad band pass characteristics.

All the potentials required for the frequency scanning panoramic receiver are produced by a common source of power supply and all can have a common ground return to the chassis.

The frequency scanning panoramic receiver described herein can be made to cover a rather substantial band by ganging the condensers 9, 10, 11, or by using band filters. The bandwidth of the receiver will be determined by the voltage variations applied to the grid 43 of tube 15, which is controlled by the potentiometer 26. The latter acts, therefore, as a band expansion or band compression device. If the constants of the circuit of tube 15 are properly adjusted, it is possible to make the frequency shift of the oscillator 14 substantially equal both above and below its average frequency, which permits a panoramic observation of equal bands immediately above or below a given center frequency. If the total band width is not too great, the input stages 12, 13, may be made of sufficiently broad band pass characteristics to avoid the necessity of tuning the condensers 9 and 10 and still obtain substantial linearity of response over the desired band, as illustrated in Fig. 4*a*. The condensers 9 and 10 are substituted therein by condensers 9*a*, 9*b* and 10*a*, 10*b*, which are permanently adjusted to admit a band of the required width.

It is possible to tune, or vary the center frequency of the frequency scanning panoramic receiver by either adjusting the oscillator condenser 11 or by adjusting the center arm of biasing potentiometer 70. This variation can take place either manually or automatically and in the latter case it can be effected by either the same aneroid cell 1, which controls the transmitter-oscillator, by mechanically linking it to condenser 11 or by another similarly constructed aneroid cell, as shown in Figs. 4*a*, 11*a* and 15. In Figs. 4 and 4*a*, I have shown a dotted line between condensers 11 and 3 and aneroid cells 1, 1*a*, and 1*b* to show a mechanical link.

This control of the condenser 11 by an aneroid cell will afford a constant retuning of the center frequency of the panoramic receiver, this representing at all times the local altitude frequency. The frequencies above and below is represent altitudes above and below it and the bandwidth can be such as to cover an altitude of, for example, *n* feet above and *n* feet below the airplane. The scale can be expanded or contracted at will. This is useful if the frequency assignment covers a relatively wide band, so as to take care of very great altitudes. The ceiling of modern planes increases continuously and if we would have to cover on a few inches of an oscillograph screen at all times the entire band, the readings may be difficult to make or would not have sufficient accuracy.

With this method of centering the observation and limiting it by band construction to certain vertical levels above and below the observer, this objection is removed and, besides, the pilot has all the warning and information he wishes, as he is not interested in what happens too high above or too far below him.

The centering of the local altitude, corresponding to the local altitude-frequency greatly simplifies the design of the commutator controlling this signal. This commutator can be also mechanical as shown in Fig. 4*a*, acting every time when the receiver tunes through the center region of its band.

In this figure, 105 represents a rotating shaft, which can be that of the motor-generator 106 producing the plate current supply, and which is at ground potential. The plate current of the transmitter from the cathode of the oscillator tube 6 passes through a brush 201 which rides on a metal ring 200*d* grounded through the shaft 105. A narrow segment 200*c*, of an insulation material periodically interrupts this current, therefore keying off the oscillator tube 6. On the same shaft 105 an insulated ring 100*d*, having a narrow grounded segment 100*c*, and a brush 101, form the elements controlling the charge and discharge of a condenser 104 through a resistor 103. A source of sawtooth voltage is created and this is amplified through tube 17 and used for controlling both the movement of the cathode ray on the screen (deflecting element 63) and also to periodically vary the reactance of tube 15, and accordingly the frequency of the receiver oscillator 14, through a three position bandwidth control 25*a*, *b*. The phase relationship between the sawtooth voltage and the keying of the oscillator is determined, once and for all, by the relationship of the brushes 101 and 201, and of the segments 100c and 200c.

Fig. 3a shows such a time relationship. The upper line represents the sawtooth voltage curve which, in this case, includes a small time period ($t_1$) representing the current at ground potential as determined by the width of the segment 100c. This time period can, however, be reduced to negligible value by making that segment very thin. The second line represents the variation of plate current in the transmitter showing the time periods when this is off ($t_2$), this total time period depending upon the width of segment 200d. The sharper the circuits of the receiver, the narrower can be made this segment. By spacing the segments 100c and 200d, 180° apart, and by maintaining the brushes 101 and 201 in the same plane, the interruptions $t_2$ will take place at the moment when the sawtooth current passes through its center value, and therefore when the receiver tunes through its center frequency, or in other words, when the stratoscope screen indicates its altitude frequency.

Whereas in Fig. 4, I have shown one aneroid cell 1 driving the two condensers 3 and 11, in Fig. 4a, I show two separate, but identically operating cells, 1a and 1b, each driving one condenser. In the latter figure I also show bandpass input circuits requiring a single adjustment, and a selective audio response circuit described below.

*Frequency selection.*—By connecting headphones or a loudspeaker in the output of the detector, a sound will be heard when a signal appears on any portion of the tuning range. This will, as said before, act as an alarm for the pilot. It is, however, advantageous, for various purposes, to be able to select for an auditive (or visual) response, only the signals at a given frequency within this range. Such a selective device is shown in Fig. 4a, in which the output of the detector is fed through a push-pull amplifying stage 202a, 202b, and a selecting commutator 35a, 35c, 35d, to headphones 34a and/or a neon bulb 34b. This stage 202a, 202b, operates only periodically when the brush 35a connected to the cathodes of tubes 202a and 202b is grounded through the metal segment 35c of the rotary commutator 35d. This commutator is rotated together and in synchronism with the other commutators on shaft 105. By adjusting the position of the brush 35a around this shaft, by means of a dial, we can select any portion of the bandwidth where the headphones will respond, in other words, any frequency within the range of the receiver. If a signal is present at that frequency a "chopped" noise is heard. I use a properly balanced amplifying stage, in order to eliminate the commutation click so that only the actual signals coming through the detector are heard. By setting the brush 35a in a given fixed position, for example corresponding to the center frequency of the receiver, only signals corresponding to that frequency can be heard. This position may be used permanently and is important for three reasons: 1. Because the pilot will receive definite indication of actual danger from an obstacle (plane, for example), situated at his own level. 2. Because it permits means of aural as well as visual signaling for navigational and traffic control, as it will be shown below. 3. Because it permits special uses of ground marker beacons. Such a condition is represented in Fig. 3a in which I show on the lower line the phase relationship between the response of devices 34a, 34b and the sawtooth voltage (which is linked to frequency variation). The solid lines show the last condition described, that is a response at the center frequency. The dotted lines on the left of the first, represent response at a frequency nearer to $F_m$.

It is possible to link the frequency of one oscillator to the other by many other means, some being electronic, wherein a variation of frequency can be converted, for example, in a variation of voltage and then apply this variation of voltage to the other oscillator to create a variation of frequency again. My receiver is ideally suited for such types of control because I can convert variations of voltage easily into variation of frequencies, through the changing of the bias voltage 71 on the reactor tube 15.

In my above mentioned patents, supra, I have shown how I can simultaneously receive on a frequency scanning panoramic receiver two bands of frequencies which can be observed on two different portions of the oscillograph tube. This is a very important requirement if the receiver is to be used for navigational purposes, so as to avoid carrying on board several receivers. It may be assumed, for example, that the flier wishes to follow a string of radio range beacons and also avoid any dangerous obstacle, fixed or mobile. The string of beacons may operate on one continuous band of frequencies different from the altitude frequency band. An electronically controlled receiver showing simultaneously two bands of frequencies can be used advantageously for the purpose. Such results can be obtained in the following manner: Synchronously with the sawtooth generator, I provide means for generating a "square-wave" alternating current. This is composed of a series of electrical impulses of a constant amplitude, each such impulse having a duration equal to the duration of one sawtooth cycle. These impulses are intermittent, each being followed by an equal time period when no current is generated.

Fig. 7 shows on its lower part at M three such square-wave pulsating current impulses; N represents six cycles of synchronous sawtooth current impulses and M+N represents current resulting from the combination or addition of these two types of impulses. The frequency controlling tube 15 (F in the block diagram, Fig. 5), in which I provide a circuit for feeding a current such as the one represented as M+N will alternately cover two bands of frequency whose separation from each other will be determined by the amplitude of the square-wave input.

At the top of Fig. 7 I show an ordinate representing frequency variation as produced by such a combination wave in the variable frequency oscillator. It alternately covers the frequencies $F_1$, $F_2$ and $F_3$, $F_4$. The frequency separation between $F_2$ and $F_3$ can be reduced to zero by reducing the amplitude of the square-wave voltage or be increased to a maximum by increasing that voltage. It can, therefore, be seen that variations of amplitude of M will shift only one band of frequencies ($F_3$ to $F_4$) and will not affect the other band. This shift can be obtained in the simplest manner by applying the square-wave directly to the biasing potentiometer or resistance 70 (Figs. 4 and 4a).

Fig. 5 represents another block diagram showing how this receiver operates. The same letters are used as in Fig. 2 for the common elements of the two types of receiver transmitter combinations. In Fig. 5 in addition S represents the square-wave generator, and T the mixer of the sawtooth and square-wave currents. Previously to being mixed, the sawtooth component is applied to one of the deflecting plates 63 of the cathode ray tube and the square-wave component to another deflecting plate 62, normal to the first, where it is combined with the signal from the channel D.

The effect of this application of the square-wave is to recurrently, and at the end of each cycle of the sawtooth wave, shift the frequency sweep axis of the cathode ray tube, so as to alternately obtain two parallel lines on which the signals contained in the bands $F_1$ to $F_2$ and, respectively, $F_3$ to $F_4$ will appear.

The linear separation between these two parallel frequency sweep axes is a function of the amplitude of the square-wave voltage applied to the deflecting plate 62, and this is controlled through any appropriate means.

Fig. 6 shows a detailed diagram of the elements G, S and T of Fig. 5. Tube 80 is a double triode, the grids of which are cross-connected in such a way that each triode section becomes alternately blocked. The frequency of this blocking action is determined by the rate of charge and discharge of condenser pairs 84, 85, 86 (groups *a* and *b*), a pair of which are selected by switch arms 88*a* and 88*b*, and also by the value of the dual rheostats 87*a* and 87*b*.

Another tube 81 acts as a sawtooth oscillator and the frequency controlling elements, that is, condensers 84*c*, 85*c*, 86*c* and rheostat 87*c*, are so chosen that they produce a sawtooth current of practically the same frequency as the square-wave current.

The synchronism is complete, however, by connecting the grid 89 of tube 81 to one of the plates of the tube 80. The frequency control of both tubes is, therefore, obtained by single controls 88*a*, 88*b*, 88*c* and 87*a*, 87*b* and 87*c*.

Tube 82 is another double triode which is used in the event that high signal voltages are required. Tube 82 acts as an amplifier in connection with the sawtooth and square-wave oscillators.

The amplitude controls 92 and 93 are used to control the voltage of the deflecting currents put into the vertical and horizontal deflecting plates respectively, of the cathode ray tube and the amplitude controls 94 and 95 are used to control the voltages applied to the grids of the mixing tube 85 (T in Fig. 5). The mixed current obtained from the plates of this tube is applied to the frequency controlling tube F.

The same results, as obtained by purely electronic means of tuning, can very well be obtained by either purely mechanical or combined electronic and mechanical means such as illustrated in Figs. 8, 9, 11 and 13. The mechanically frequency modulated oscillator is quite practical and readily made. A rapidly rotating motor driven condenser produces the frequency shift required. One precaution, however, must be taken in avoiding frictional contacts in the tuned circuit, which are invariably noisy, mostly at high frequencies. The best method to avoid this is by using insulated or floating rotors, varying the capacity between two opposite stators. Another precaution which must be taken is to properly balance the rotors dynamically, so as to avoid vibration. This can be obtained by using rotors having several blades, two, three, or more. Such a two-bladed rotor is shown at 96*a*, 96*b*, in Fig. 8.

The effect of such multi-bladed rotors is to speed up the number of images for a given motor speed. In ultra-high frequency work, where the periodical variation of capacity required is quite small and amounting only to a few micro-micro-farads, I prefer to obtain the capacity variations necessary by simply rotating a rotor of high dielectric constant between two stator plates connected in the tuned circuit. Several such dielectric rotors can be coupled on one shaft to tune as many circuits as required. One of these rotors can be used for mechanically producing a source of sweep voltage, by the periodical charge and discharge of a condenser, as described in Fig. 4 and in my patents, supra. Fig. 8 is an example of such a construction, in which 96*a*, 96*b* represent the two blades of a dielectric rotor having a 90° opening and rotating between one or two pairs of stator blades 97*a*, 97*b* and 98*a*, 98*b*. We have in fact two distinct variable condensers which can be used in two different circuits or can be connected together for obtaining a larger variable capacitor.

The center of this rotor has a metal bushing 99 which is grounded through the shaft 105 of the motor 106 (Fig. 9) rotating it, and also two small metal sectors 100*a*, 100*b*, connecting each of the blades 96*a* and 96*b*. A brush 101 is riding alternately either over the dielectric or over the grounded metal sectors in such a way as to pass from metal to dielectric exactly at the moment of maximum or minimum capacity of the condenser. This brush periodically discharges condenser 102 to the ground which condenser becomes charged through a resistor 103 when the brush rides over the dielectric.

Just as in Fig. 4*a*, the condenser 102 becomes a mechanical source of sweep voltage which is noiseless because the only frictional contact which takes place is to either the dielectric or to a grounded part of the receiver, which is not a part of the tuned circuit.

The electrical connections of such a synchronized dielectric condenser and sweep voltage generator are shown in Fig. 9 in which, for the sake of simplicity, I show only one periodically tuned circuit, an oscillator which can be the element B of the block diagrams. The synchronized condenser and sweep generator replace the elements F and G of those diagrams.

By a slight addition to this construction, I can obtain an alternating coverage of two bands shown on two different lines on the screen of the cathode ray tube, as shown in block diagram, Fig. 5.

On the same shaft 105 of this rotor, I mount a commutator composed of two equal sectors 107 and 108, Fig. 10, of double the opening of the blades 96*a*, 96*b*, that is 180°. One of these sectors is of metal and grounded to the shaft, and thence to the chassis; the other sector is of an insulating material. A brush 109 is connected to a high resistance potentiometer 110—111, connected on one side to a source of direct current (anode supply for example), and grounded on the other side. This brush will be alternately at a certain voltage or at ground potential, as the commutator rotates; a square-wave is mechanicaly produced, and can serve through condenser 112 for shifting the frequency sweep axis on the cathode ray tube as explained before. The same commutator can serve for alternatingly selecting one of two condensers which tune the oscillator circuit, as illustrated in Fig. 11; it can also serve for mechanically shutting off or reducing the power of an altitude-indicating oscillator, as illustrated in Fig. 4*a*. Such a mechanical commutator can be made to open the cathode circuit of the oscillator 6 for predetermined periods of time corresponding to the angle of the commutator sectors. The transmitter can be keyed off, for example, alternately during each part of that rotation cycle which produces image of signals on the screen of the receiver.

Mechanical means for producing two band frequency scanning panoramic reception can be better seen in Fig. 11 where, instead of having the condenser 11 permanently connected in the tuning circuit, I show two condensers 11 and 113, each being alternately connected through brushes shown respectively at 114 and 109, to the ground.

The different frequency portions are, therefore, alternately covered by the rotating condenser 96—97 previously described. By individually tuning the condensers 11 and 113, each band may be separately tuned. Condenser 11 can, as shown in Figs. 4 and 11, be controlled by a pressure controlled device as an aneroid cell whereas the condenser 113 can be manually controlled for special purposes, as shown hereinafter (Fig. 21).

The block diagram of Fig. 5 can be fully adapted to this arrangement.

The type of mechanical sweep by means of rotating commutators described has one disadvantage; one part of the images are lost by grounding the condenser 102 part of the time. The result of this is more tendency to flicker and less brilliancy of the image as can be seen from Fig. 12. I can, however, advantageously combine electronic tuning and mechanically produced periodical voltage with elimination of this disadvantage, as shown in Figs. 4*a* and 13.

In Fig. 13 the condenser 102 has been replaced by a sawtooth oscillator 16 whose grid 89 is synchronized to a mechanical square-wave generator similar to the one heretofore described, but using the 90° sectors, 107*a*, 108*a*, 107*b*, 108*b*.

This form of sector alternately switches in the tuning circuit condensers 11 and 113, at double the rate obtained before. The number of images obtained on the screen is double, because each alternate sawtooth cycle serves to put on the screen one of the frequency bands covered.

Special condensers giving variations of capacity from minimum to maximum over a greater portion of a rotating cycle, however (270° or more), can be used advantageously to reduce the loss of images mentioned above.

In Fig. 1, I have shown a simple transmitter-oscillator whose frequency is controlled by the local atmospheric pressure. I can supplement this information with that of a direction, which may be readily interpreted to indicate a given course, or to directly indicate "right" and "left" with respect to said course. Two transmitting antenna have to be used each operating on a frequency slightly different from the other, and emitting a directional signal in such an angular relation to each other, as to create an equi-signal path along said course. This method, however, is more completely described in my U. S. Patent No. 2,312,203, granted February 23, 1943.

Fig. 14 shows such an arrangement in which $T_1$ and $T_2$ are such transmitters, each feeding respectively into the dipoles $A_1$ and $A_2$ at right angles, whereby the courses $X_1$, $X_2$ and $Y_1$, $Y_2$ are created. Supposing now that a 3.5 mc. bandwidth (for example, from 122.5 to 125 mc.) is spread over 2.5 inches of a cathode ray tube screen; this represents a frequency spacing of 1 megacycle per inch, and a one-eighth inch separation between two signals represents 0.125 mc. If the two signals produced by $T_1$ and $T_2$ are, in other words, 0.125 mc. apart from each other, they will appear on the screen as two deflections separated by ⅛″. If an observer is on the equi-signal path, the peaks of the two deflections will appear equally high. If he is on one side, or the other, one peak, or the other, will predominate. The linear difference between the deflections, corresponding to the amplitude ratio of the two signals, will indicate the number of degrees off-course.

I have found that it is essential to keep the difference of wave-lengths between these signals as small as possible, so that the number of wave-lengths traveled by each signal within a few miles from the station—where the signals are generally more erratic and more subjected to the effects of reflection from obstacles—should be substantially equal, or differing only by a few wave-lengths. This reduces to a minimum the number of points where false indications could be obtained if this difference would be greater. This is a fundamental part of my invention distinguishing it from the usual type of dual frequency radio ranges, where no special precautions are taken to maintain this wavelength separation within a minimum value. The frequency scanning panoramic receiver can be made of sufficient selectivity to distinguish between two carriers of any frequency separation, as there are no interfering side-bands such as would be produced by modulating such carriers.

Two signals of very close frequency with their antenna elements quite close to each other are difficult, however, to maintain properly tuned. There is a tendency for these two signals to "pull" each other in synchronism or to create side-bands by becoming intermodulated.

By proper shielding precautions, it is possible to run the two transmitters together as shown in Fig. 14.

I can avoid, however, completely these difficulties, by sending signals intermittently through each antenna, in such a manner that when one is on, the other is off. This is represented in Fig. 19, in which $T_1$ and $T_2$ represent the two transmitting circuits including their radiators, emitting signals on adjacent frequencies, and O represents a source which causes these radiators to operate alternately. This switching of the radiators can be obtained either mechanically or electronically. The first method has the advantage of great simplicity.

In all these transmitter arrangements, the frequency or frequencies, can be either fixed or can vary within certain limits as controlled by a frequency controlling element such as an aneroid barometer, as shown in Fig. 1.

In the latter case, and provided that the aneroid cells used in these transmitters are operating in identical condition, the ground transmitting stations can be used to give absolute altitude indication to the planes in their neighborhood, because both plane receivers and ground transmitters are submitted to similar atmospheric conditions.

The two antennas, whose orientation determines certain courses, can either be fixed or of variable orientation—and can be mounted either on a fixed body, or on a mobile body.

In order to extend the number of stations which can be used along a given distance, and not to crowd them too much on the screen of a cathode ray tube of relatively small diameter, I prefer in some cases to combine band extension and some manual tuning with frequency scanning panoramic tuning and, at the same time, use an indicator showing what part of the band is tuned in. This indicator can be calibrated in units of distance or of altitude, or any other convenient units. Such an arrangement is shown in Fig. 21 in which the screen 141 of a two-band receiver is shown; 142 is a slider which can move to right or left within certain limits by the action of idler pulleys 143, 144 and manually controlled pulley 145, over which a steel string 146 is wound. This string is connected to the two ends of the slider 142.

This slider can move so that either end of it can come in line with one extremity of the screen of the cathode ray tube. It is calibrated in miles, and their separation corresponds to the separation between signals appearing on the cathode ray tube screen; for example, as shown in Fig. 21, when all the way to the right it will show the stations from the reference point (zero miles) up to 200 miles and when all the way to the left it will show the stations from 200 miles up to 400 miles. This is obtained by connecting the same pulley 145 with the shaft 147 of a rotor of a condenser 113 (see Figs. 11 and 13). A frame in this slider permits insertion of a card showing in their spatial relationship a series of beacon stations, for example from Chicago to Erie. Each beacon station may determine either a two-course or a four-course route, according to the type of antennas they use. A flier starting from Chicago will set condenser 113 fully in, for lowest frequency ($F_{min}$) and the slider will, by this motion, move to its extreme right position, and the beginning of the dial on the left corresponding to distance zero, indicating Chicago, will correspond to $F_{min}$ on the screen. The dual frequency beacons will appear one after the other, further to the right, as the flier progresses along the course, several being seen according to their signal strengths. The observer can, if he wishes to, gradually bring them to the center and continuously maintain the true relationship between the reading on the card 148, mileage indication on slider 142 and position of the signal on screen 141. Such band spreading arrangement as shown is the equivalent of multiplying the diameter of the screen by two. Naturally this can be multiplied still more if desired. As the flier reaches the end of the course marked on the card, he enters a new zone where the frequencies $F_{min}$—$F_{max}$ are repeated and he replaces the card 148 with a new one, resetting his dial to zero miles. By reducing to zero the sweep voltage applied through potentiometer 26 to the reactance tube, such a receiver becomes an ordinary uni-signal receiver tuned at the center frequency defined hereinabove. A switch 295 which has this function is shown in Fig. 4*a*. The device 34*a*, Fig. 4*a*, will then reproduce the auditive signal of any station which corresponds to that center frequency and which can be marked as a hairline on the center of the oscillograph screen (Fig. 21).

This dial arrangement can very well be used with either a single-band or a two-band frequency scanning panoramic receiver, such as shown in Figs. 5, 6, 7, 11 and 13, in which latter case, one band is controlled by a manual setting such as just described (condenser 113), and the other band by an automatic setting (condenser 11) determined, for example, by an aneroid cell, and wherein one setting does not disturb the other one due to the independence of their tuning elements.

Fig. 21 shows such a combination: above the screen 141 an altitude scale 148′ is used with the top frequency axis showing O in its center. It is calibrated in altitudes up to 2000 feet above to the right, and 2000 feet below to the left of the center line. An independent, ordinary altimeter dial 149 may be set nearby, to give the actual altitude which in Fig. 21 is 5200 feet.

A signal 150 appears on the screen, above the line of beacon signals, indicating the presence of a warning station about 1000 feet above the observer, in other words, at 6200 feet. This may be a mountain peak or another plane, and this matter is easily determined, as it will be explained hereinafter, according to the rate of "blinking" of interruption of the signal.

In the first case, the pilot knows that he must rise until the signal passes to the left of the center line, that is, below him.

In the second case, certain traffic regulations are applied and as each pilot either goes higher or lower, their respective change of position is seen by the two observers in their receivers. Where a receiver such as shown in Fig. 11 is used, the lateral position of the deflections on the lower frequency axis remain independent of the change in the lateral position of the deflections on the upper frequency axis because the two frequency bands to which they correspond are independently controlled for the upper and lower line. With reference to Fig. 11 for example, the upper line deflections are controlled by the condenser 11 (which in its turn is controlld by an aneroid cell), and the lower line deflections by condenser 113 which may be manually controlled. The two functions, however, may be separated if desired and two screens be used, one only for airway beacons and another for stratoscope indications.

Fig. 15 shows a single-band stratoscope screen in which the frequency axis is produced vertically. Three different calibrations appear to the right; the first is of 150 feet above and below, the second is 1500 feet above and below and the third is 4500 feet above and below. A three-position knob 26*b* is shown below, permitting the selection of any desired band spread. This control is shown on Fig. 4*a*, as an arm moving over the multitapped resistor 26*a*. A dual-frequency directional beacon is shown 500 feet below and three obstacles at various altitudes above the observer. The amplitude axis is calibrated in miles corresponding to the strength of stations of equal, standardized power.

Fig. 16 shows the screen of a receiver calibrated in heights from 0 to 10,000 feet, to be used by the traffic controlling authorities. It is necessary to either tune this receiver or adjust its altitude scale up or down according to local atmospheric pressure. This tuning or adjustment can be made either manually, or automatically, by means of an aneroid cell such as explained above. An inclined line marked "glide path" indicates the amplitudes expected from aircraft engaged along the glide path and their respective distances can be read on the lower scale.

*Airway traffic control.*—It is possible to install panoramic receivers for airport traffic control but minus the cathode ray tube, at various points along airways, and to convey the electric impulses creating the deflections of the cathode ray, to a distant point situated at a traffic control center.

These impulses are of two kinds; a periodic voltage which produces the cathode ray sweep and the short impulses created by the signals themselves. There is no need to convey the first type of impulses, because these can be exactly reproduced at the traffic control center. If, for example, a source of 60 cycles alternating current is available, both at the point where the receiver is installed along the airway, and at the control center, an identical sawtooth voltage or any other type of wave having a predetermined shape, can be produced in both places, in perfect synchronism by known methods. It is possible, however, to use directly the sinusoidal current for the panoramic reception, as it will be shown separately, and in this case the solution is still simpler, because we dispose at both places of the required sweep voltage. The signal impulses can be sent either by wire or by radio communication according to well known methods which do not require description.

The use of sinusoidal currents for sweeping the cathode ray, in combination with another type of wave for the frequency sweep of the oscillator, results in an advantageous spacing of the signals on the screen, which spreads the frequency scale toward the center and compresses it toward the extremities. This is a desirable thing in a stratoscope because it is important to be able to read more accurately variations of vertical levels produced nearer the level of the aircraft, rather than at much higher or lower levels. In Fig. 15, I show such a spacing. Furthermore, the use of sine wave simplifies certain construction problems such as, the generation of a special sweep voltage and the difficulties of sending such types of current undistorted over long lines, for example, from one end to the other of a fuselage. Such sine waves can be used advantageously also for keying or modulating the stratoscope transmitter.

The simplest use of sine wave is to apply it simultaneously to the grid 43 of the reactance tube 15 and to the cathode ray deflecting element 63, Figs. 4 and 4*a*. This eliminates also the need of an amplifier tube such as 17, as I can obtain the sufficient A. C. voltage directly from a transformer. In order to obtain, however, the desirable non-linear frequency spacing shown in Fig. 15, I must use a wave of pyramid form for the frequency sweep. The simplest way to do this is by using a rotating 180° condenser plate to create the necessary periodical tuning (96—97, Fig. 11). Such a condenser actually produces a pyramid variation of capacity (or frequency) versus rotation (or time), as shown in Fig. 12.

A motor generator such as 106 producing some A. C. voltage, can be used for supplying both the sine wave required and the motive force for such a condenser variation. Fig. 17 shows the relationship between the various elements. Curve S shows the sine wave producing the cathode ray sweep voltage varying between +E and —E. Curve C shows the variations of frequency or of the frequency scanning panoramic receiver, between $F_m$ and $F_M$ passing through a center frequency $F_c$. These two are in phase to each other, passing through their extreme values at the same time. As the elements *ab* and *bc* on curve S are equal but opposite in direction, and as elements *a'b'* and *b'c'* on curve C are also equal and opposite in direction, the spot on the screen will travel over the same line back and forth, faster in the center and slower nearer the ends of the frequency axis. On this Fig. 17, the curve M shows how the stratoscope transmitter may be modulated with the same sine wave so to obtain the periodical interruption, or modulation, required at the center frequency. This line represents a rectified sine wave of the same frequency as S, as shown by the dotted lines showing the original, non-rectified current. By supplying such a rectified current to the plate supply of tube 6 (Fig. 4) marked +B, I obtain directly the exact modulation required for rendering the transmitter either completely inoperative, or operative at its lowest plate current, when the frequency scanning panoramic receiver tunes through Fc, the transmitter's frequency. This is illustrated in Fig. 17 by the vertical groups of parallel lines passing close to points *d, e, f, g, h* on curve C. These lines meet the transmitter plate current curve M along a dotted line showing the low current limit where the transmitter stops oscillating. The same results can also be obtained by supplying D. C. plate voltage to +B and using the sine wave for grid modulation, for example, the grid 68 at tube 22. Also, instead of using rectified sine wave, the same results can be obtained by using a sine wave of double frequency of S in the proper phase relationship. The phase shift between sweep frequency and modulating frequency can be obtained by a simple condenser resistance network, and if this is necessary it is preferably used for the sweep voltage, where there is no power required. The condenser plate can, naturally, be mounted so as to remain in phase with that sweep voltage at all times. The capacity variations required for periodically tuning the oscillator, need not take place at or near the oscillator. By using large value capacity, the oscillator coil 115 (Fig. 11) can be tapped down and the lead can be brought to a certain distance.

*Station identification.*—The identification of stations may be obtained in various manners with a panoramic receiver, and in ways impossible to be obtained with ordinary receivers.

One of the means which can be used is the rate of interruption of a signal. From the foregoing explanations, it results that either the dual-frequency beacons, or the collision warning signals sent by planes are periodically interrupted or modulated signals. This rate of interruption or modulation can be determined easily, provided that the frequency sweep rate of the frequency scanning panoramic receiver is adjustable. This can be obtained very readily with the electronically controlled sweeps shown and I have provided the necessary controls for this purpose (see 84—87, Fig. 4). In a mechanically controlled receiver, continuously adjustable speed devices can be used for this purpose, either by varying the speed of the motor itself or of the devices connecting the motor to the receiver.

High frequency sweeps are advantageous when many identifying frequencies are required. In order to be able to use very high frequency sweeps of the order of a few hundred to a few thousand cycles per second, I prefer applying directly to the plate 62 of the cathode ray tube, non-rectified intermediate frequency signals obtained from transformer 47 (Fig. 4). In this case, the deflections appear on both sides of the frequency sweep axis and take a distinctive appearance which in the stratoscope is very appropriate; they look like the wings of an airplane, seen from the front.

By synchronizing the sweep frequency with the frequency of modulation of a signal, I can receive that signal as if it was of unchanging nature because every time the receiver sweeps through the frequency of the signal, the signal is picked up at the same amplitude. If such a signal is interrupted periodically, a perfect synchronism could cause it to be absent in the panoramic receiver entirely. This can happen in case of collision signals sent by planes, which could be synchronized by chance with a receiver, so that they would not be received. This, however, would require a combination of coincidental factors, rarely met in practice; the two receivers in two different planes would have to be swept in absolute synchronism and be tuned to the same frequency continuously. The chance of this condition occurring is remote and is further reduced by reducing the total interruption time of the collision warning transmitter to the shortest possible limit.

The dual-frequency beacons forming part of a common system can be alternately keyed on and off at one and the same frequency rate determined by properly adjusting the keying frequency of element O in Fig. 19. The observer can also adjust the sweep frequency of his receiver so as to see, for example, a very slow change of one frequency to another, or he may stop (momentarily and during the identification test) the signal on one frequency only.

By noting the position of the sweep frequency controls at which this occurs, the pilot can distinguish one set of signals from another set. One set of beacons may have for example, an on-off rate of 27 cycles per second, another one of 32 cycles per second, and the different settings he would require on his receiver to "freeze" one set of motions will tell him which set he is considering. This synchronizing is also useful for eliminating certain forms of recurrent noises, such as from motors or vibrators. The sweep frequency of the receiver can be adjusted in synchronism with the source of noise, whereby such noise signals become "frozen" in a fixed part of the screen where they cause no interference, or may be entirely eliminated.

Dual frequency beacons, therefore, can be made to give characteristic signals which generally appear as two adjacent V-like deflections, closing at the bottom. They cannot be mistaken for ordinary unmodulated signals which are open at the bottom. Such beacons can be, if desired, code or voice modulated at certain fixed intervals. The pilot, having a stratoscope on board with a selective auditive device, such as shown in Fig. 4*a* (35*a*, *c*, *d*), can read such code and identify the station. Phone can be heard on a stratoscope receiver by simply switching off the frequency sweep and transmitter (switches 205, 206), and turning on the switch 208 which cuts off the "phone chopper." In this case the receiver remains tuned to its center frequency, but it is possible to provide a means to retune temporarily the receiver separately and independently from the cell 1*b*, by bias tuning, that is by varying the bias voltage applied to the grid of the reactance tube 15, through the potentiometer 70. In this case, I obtain the equivalent of an ordinary radio receiver, tunable over a frequency range and permitting two-way communication with another station. The stratoscope transmitter 6, Fig. 4*a*, can then be voice-moduated in the usual manner, for example, by the use of a microphone in its cathode circuit (switch 205). It will still be tuned by the aneroid cell and, therefore, continue to emit collision warnings visible on the screens of other receivers.

Aircraft also can be identified, either by the ground observers, or by pilots of other aircraft, according to a characteristic rate of modulation which is assigned to each. Such a modulation is produced by the periodic transmitter modulator 200*c*, 200*d*, shown in Fig. 4*a*. By assigning various modulation frequencies the probabilities of two aircraft operating in absolute synchronism are greatly reduced. By making the motor 106 rotate at a speed proportional to the air speed of an aircraft, the modulation rate can be used as an indication of speed. Planes flying in formation can maintain constant speed by maintaining their indications in synchronism.

Further identification can be added by modulating the emitted signals with code or even voice, by simply providing each transmitter with a code wheel or a modulator and a voice record. The chopper 200*c*—200*d* itself can be made to have as many inserts 200*c* as desired, and the inserts can be of any desired angular size for modulating the transmitter 6 according to CW or as a given tone. A pickup can be put in its cathode circuit which is shown open by switch 205.

Two-course beacons are to be preferred to four-course beacons, because they can be made to give a positive indication of "right" and "left."

In Fig. 22 I show a course $X_1$—$X_2$ determined by such a dual-frequency beacon located at O and alternately emitting on each side of the course signals L and R on adjacent frequencies $F_L$ and $F_R$. Suppose that frequency $F_L$ is higher than that of $F_R$, and a plane carrying a panoramic receiver flies in the direction of the arrow from $X_1$ to $X_2$. If the screen of this receiver is so disposed that higher frequencies are to the left, and if the plane happens to be on the left side of the line $X_1$—$X_2$, for example, in points $Y_1$ or $Y_2$, the left hand signal becomes taller than the right hand signal (see Fig. 22*a*) and vice-versa, if it happens to be on the right side $Y_3$ or $Y_4$, the right hand signal becomes taller than the left hand signal (see Fig. 22*b*).

Beacons giving, in combination, a number of simultaneous indications can thus be made. As an example, I shall describe one which simultaneously indicates: altitude of a point, barometric correction, wind direction and velocity. This is simply a combination of the principles described above. The beacon is a dual-frequency two-course radio range transmitter, whose average frequency is determined by a barometer controlled oscillator as explained from which he can determine his height above the ground.

The antennas of those two transmitters determine a course similar to $X_1$—$X_2$ of Fig. 22, but this course is orientable according to wind direction, by pivoting the antenna array around a central point. Fig. 23 shows in simplified form an upper view of such an antenna array in which 151, 152 are the vertical antennas each connected to one transmitter. Each antenna acts as a reflector for the other when one works, obtaining as a result, two patterns opposed in phase, shown diagrammatically as 153 and 154.

It is clear that the use of a stratoscope on board an aircraft permits additional possibilities, some of which I will now describe. Airways can be established, which are defined not only by their direction, but their height as well. If the average frequency of a dual-frequency direction indicating beacon is made to correspond to a predetermined altitude-frequency, a stratoscope will indicate the presence of such a beacon only when the aircraft will fly within certain vertical levels. At a given altitude, the beacon deflection will appear on the center line of the stratoscope screen, If the aircraft is above or below that level, the deflection will appear below or above that line. It is, therefore, possible to regulate traffic along such airways, and maintain a one-way traffic above that predetermined level up to a certain maximum limit and traffic in the contrary direction below that level down to a minimum vertical level. For example, an airway running east-west can be marked by a series of beacons 25-50 miles apart, whose frequencies correspond to heights of 7500 feet above ground. Pilots flying east will be directed to fly so as to see the airway beacon deflections appear between 250 and 1500 feet above their level and those flying west will have to maintain altitudes showing these beacon deflections appearing between 250 and 1500 feet below their level. There will always be, therefore, a minimum vertical separation of 500 feet between aircraft running in opposite directions, which will inherently increase the safety of air traveling.

These conditions are represented in Fig. 18, in which A, B, C represent a series of ground stations, each emitting a signal corresponding to an altitude frequency of 7500 feet. This means that each of these transmitters is adjusted by means of a barometer condenser which varies a certain mean frequency according to weather conditions. This mean frequency is set at the beginning to represent the local altitude of points A, B, C, etc., plus 7500 feet, the height of the center level of the airway.

The flier will, therefore, follow more or less the general contour of the earth and will know at all times his actual altitude from the position of the airway beacons. Where such an airway crosses another one, the latter can be either higher or lower in altitude. By using the band compression switch the signals from two airways can be seen simultaneously on the screen so that the flier can pick up the other airway when required, knowing whether he must ascend or descend. Simple traffic rules can be evolved whereby a pilot passing from one airway into another must make certain regulation turns, taking him down or up to the required level without danger of collision.

Such vertically separated airways have the additional advantage of permitting a better check up of traffic conditions along airways by the traffic control centers. By installing receivers at airway intersections, it will be easy to know the number of planes going in each direction, according to their vertical levels.

Aircraft can be lead from one elevated airway to another one, which may be higher or lower, or to an airport by means of vertical level markers, whose frequency is adjusted to indicate a certain altitude above a given point. Their pattern of transmission is fan-like. Fig. 20 shows a system of markers gradually leading a plane from an airway at 7500 feet altitude to a landing runway. The horizontal line shows a stretch of 14 miles from the point where the plane must touch the wheels to the ground and the curve following in landing. Points *a, b, c, d, e, f*, represent landing markers which emit frequencies corresponding to the altitudes of, for example, 5000 feet, 3000 feet, 2000 feet, 1500 feet, 1000 feet, 500 feet. They can be dual-frequency directional beacons lined up to lead the aircraft along either a straight or curved path. The pilot coming along an airway, for example, at 6500 feet altitude, will see the signal from the marker *a* at 1500 feet below him and will take a steep glide to bring that marker in the center line (at which moment he may also hear it in the phones). He will continue that steep descent and will then see the marker *b*, which may indicate a slight change of direction. By passing its maximum signal through the center of the screen he will know that he is at the proper distance (in our case 10 miles) and proper altitude (3000 feet) for that distance. The same procedure will be followed for marker *c* which brings him to 2000 feet, at eight miles, then to marker *d*, which brings him to 1500 feet, at six miles. At that moment he sees appearing on the lower edge of the screen the airport altitude and runway beacon; this is also a dual-frequency beacon, barometrically controlled, which indicates the airport altitude by its frequency and the direction of the runway by the two peaks it produces.

For the moment he sees this beacon until he reaches marker *e* (1000 feet, four miles), the pilot must enter in the normal glide path of the plane which will lead him to a landing. This glide path can be followed by maintaining a predetermined relationship between deflection amplitude and altitude. In Fig. 15 line A represents the variation of a signal which increases in strength as the point O on the runway is approached. The line B represents an equi-potential glide path obtainable by properly shaping the transmission pattern of the airport altitude and runway beacon. Either type of line can be used. The last 150-200 feet of altitude can be read with greater precision by panoramic bandspread. An outline of an aircraft appears on the center of the screen to better convey to the pilot a sense of his vertical position with respect to the obstacles represented thereon.

Beacons such as just described may be used in an emergency landing field, where a pilot can make a landing even if no personnel is there to assist him. His stratoscope will indicate if the field is clear and no other planes are there, or if there are, would indicate which plane is lower and which would have the priority to make a landing.

Although I have mentioned aneroid cells as the controlling devices in the system of my invention, I desire that it be understood that other instruments may be used to serve similarly and to impart a certain knowledge; for example, a tachometer or speedometer may be employed to indicate speed or velocity, a thermometer to indicate temperature, a gyroscope to indicate direction, etc. Therefore, in some of my claims I have used the expression "an independent controlling device" to signify any such device, which operates independently of the radio receiving or transmitting system, but which controls the operation thereof.

In the methods I described, I have shown only specific examples for obtaining certain results, but, it will be understood that I can obtain similar results by many other combinations of the elements described for shifting frequencies, keying on and off oscillators, periodically selecting one between a plurality of circuits, etc.

In these specifications and in the claims which follow, the term aneroid cell has been used to signify any device which is operated by changes of altitude, whether through changes of atmospheric pressure or of capacity to ground, etc. Its use in the stratoscope is to cause certain electrical or mechanical variations which change the tuning of a receiver or a transmitter.

While I have described my invention in certain preferred embodiments, I desire that it be understood that modifications may be made and that no limitations upon my invention are intended other than may be imposed by the scope of the appended claims.

What is claimed is:

1. In a system for indicating a predetermined range of vertical levels along an airway, a plurality of transmitters installed along said airway, each transmitter having means for generating and transmitting signals, means for varying a value of an information bearing characteristic of each of said signals in accordance with variations of ambient atmospheric pressure, and a receiver for receiving said signals carried aboard an aircraft, said receiver comprising means for automatically conditioning said receiver to receive said signals only while said signals have a predetermined range of values of said characteristic determined in accordance with the vertical level of said receiver.

2. A system for indicating a predetermined vertical level along an airway, comprising, a plurality of transmitters installed along said airway, each transmitter having means for emitting a direction indicating signal associated with a further signal characteristic having altitude significance, and a receiver carried on board an aircraft, said receiver having means for indicating visually the direction signified by said direction indicating signal and means for automatically conditioning said receiver according to the vertical level thereof to enable reception and visual display of said signals only with a predetermined relatively narrow range of vertical levels.

3. A navigational system for avoiding collision between planes moving along an airway, including a plurality of transmitters installed at predetermined points adjacent to said airway, each transmitting signals having an information bearing characteristic adapted for defining a predetermined vertical level along said airway, and a plurality of airplanes each carrying a receiver, each said receiver comprising means for conditioning said receiver to enable reception of said signals only while said aircraft is within certain predetermined vertical levels, each of said receivers comprising a visual indicator responsive to said signals for displaying a relation of the vertical level of said receiver to said predetermined vertical levels.

4. A navigational system comprising a plurality of transmitters located on the ground for defining an airway, each of said transmitters being adapted to transmit a signal having a value of an information bearing characteristic corresponding with a navigational parameter of said system, and a receiving and indicating means located aboard a mobile craft for receiving only signals transmitted by said transmitters which have a predetermined narrow range of values of said identifying characteristic corresponding with a predetermined narrow range of values of said navigational parameter at said mobile craft, and for interpreting in terms of a visual indication all signals received by said receiving means in terms of said value of said characteristic.

5. The combination in accordance with the preceding claim wherein said receiving system comprises a cathode ray tube indicator means for providing a continuous simultaneous visual display of said predetermined narrow range of values of said characteristic.

6. A combination in accordance with claim 4 wherein said navigational parameter is altitude.

7. A navigational system for aircraft comprising, a plurality of ground located transmitters, each of said ground located transmitters being adapted and arranged to transmit signals having a frequency bearing a predetermined relation with the elevation of said transmitter, a frequency scanning receiver-indicator aboard an aircraft, means for tuning said frequency scanning receiver to receive said signals only over a predetermined narrow range of vertical levels of said aircraft and for displaying visually a relation between the frequency of said signals and the tuning of said frequency scanning receiver.

8. A navigational system comprising at least one ground located transmitter for transmitting direction indicating signals, a receiver aboard an aircraft, said receiver comprising direction indicating means, and means for maintaining said receiver adjusted to translate direction indicating signals provided by said at least one transmitter only while a navigational parameter of said aircraft falls within a predetermined range of values of said parameter.

9. A navigational system for aircraft comprising a plurality of transmitters, each transmitter being adapted and arranged to transmit signals having a value of an information bearing characteristic which bears a predetermined relation with the elevation of said transmitter, a receiver located aboard an aircraft for scanning a range of values of said characteristic, means for adjusting said receiver to receive said signals only over a predetermined narrow range of vertical levels of said aircraft and means for displaying visually a relation between the value of said characteristic and the adjustment of said receiver.

10. A navigational system comprising a plurality of transmitters for establishing a predetermined vertically defined path in terms of a value of an information bearing characteristic of a transmitted signal, and a plurality of aircraft each carrying a radio receiver adapted to translate and indicate said signals within, but not above and below, a predetermined narrow range of values of said characteristic determined in accordance with the vertical level of said receiver, whereby said aircraft may be guided with respect to said vertically defined path.

11. A navigational system for aircraft comprising a signal transmitter, means for tuning said transmitter to a frequency corresponding with the elevation thereof, a receiver mounted in an aircraft, said receiver comprising means for automatically adjusting its tuning to a frequency corresponding with its elevation, and means for providing a simultaneous indication of the bearing of said transmitter and the difference of the elevations of said transmitter and receiver in response to said signals.

12. A navigational system for mobile craft comprising a transmitter for transmitting signals having a frequency corresponding with a navigational parameter associated with said transmitter, a receiver mounted in a mobile craft, said receiver comprising means for adjustment thereof to enable translation only of signals having a frequency corresponding with a predetermined range of a navigational parameter of said mobile craft, and means for providing a composite indication of the bearing of said transmitter and of the relation of the navigational parameters of said transmitters and of said mobile craft.

13. A navigational system for mobile craft comprising, a transmitter for transmitting signals having a value of a characteristic of said signals which bears a predetermined relationship to a navigational quantity, a receiver located aboard a mobile craft, said receiver comprising means for adjustment thereof to enable translation of only said signals having a value of said characteristic bearing a predetermined relation to said navigational quantity subsisting at said mobile craft, and means for indicating as a composite indication aboard said craft a relationship between said transmitter and said craft having navigational significance and for indicating the relationship between said navigational quantities.

14. A system for indicating a predetermined limited range of vertical levels along an airway, comprising, a plurality of transmitters installed along said airway, each transmitter having automatic means for varying its frequency according to variations of ambient atmospheric pressure, and a panoramic frequency sweeping receiver carried on board an airplane for providing a visual display of a frequency spectrum, said receiver comprising means for automatically tuning said receiver according to its vertical level, the frequency sweeping range of said receiver being such as to receive and display said signals only within said predetermined limited range of vertical levels.

15. The combination in accordance with claim 14 wherein said transmitters are each characteristically modulated.

16. A system for indicating a predetermined vertical level along an airway, comprising, a plurality of transmitters installed along said airway, each transmitter having means for emitting direction significant signals at a frequency having altitude significance, and a panoramic receiver carried on board an airplane for providing a simultaneous visual display of the frequency content of a frequency spectrum, said receiver comprising means for indicating visually directions of said signals, and means for automatically tuning said receiver according to the vertical level thereof, the visual display range of said receiver being such as to enable visual display of only those of said signals having frequencies corresponding with a limited range of vertical levels.

17. A system for indicating a predetermined vertical level along an airway, as set forth in claim 16, wherein said direction indicating signals are oriented along said airway.

18. A system for defining an airway between predetermined vertical levels, comprising: a plurality of radio frequency transmitters installed at predetermined points along the airway, each of said transmitters having means for emitting a direction indicating radiation pattern oriented along said airway; automatic means for varying the radio frequency of each of said radio frequency transmitters according to local variations of ambient atmospheric pressure; a frequency scanning receiver mounted on board an airplane, said receiver having automatic means for visually indicating the direction of said signals and the values of said radio frequencies, said receiver further comprising means for automatically maintaining its tuning in accordance with its altitude, the acceptance band of said receiver being such as to receive said signals only while said aircraft occupies a predetermined limited range of vertical levels.

19. A navigational system for avoiding collisions between airplanes moving along an airway, including a plurality of transmitters installed at predetermined points adjacent said airway, each of said transmitters transmitting signals at a frequency adapted to define a predetermined vertical level along said airway, and a plurality of airplanes each carrying a panoramic frequency scanning receiver, the tuning and the scanning ranges of said receivers being such as to enable reception of said frequencies only while said aircraft are within a predetermined limited range of vertical levels, and each of said receivers having a visual indicator for displaying all received frequencies, whereby all said airplanes moving in a given direction along said airway may keep above the said predetermined vertical level and all said airplanes moving in an opposite direction may keep below said predetermined level.

20. A navigational system for aircraft comprising a plurality of transmitters, each transmitter transmitting signals having a frequency bearing a predetermined relation to the elevation of said transmitter, a frequency scanning receiver aboard an aircraft, means for tuning said frequency scanning receiver in accordance with elevation of said aircraft, means for scanning said tuning to receive said signals only over a predetermined narrow range of vertical levels of said aircraft, and means for displaying visually the relation between the frequency of said signals and the tuning of said frequency scanning receiver.

21. A navigational system comprising at least one transmitter for transmitting direction indicating signals, a receiver aboard an aircraft, said receiver comprising direction indicating means, and means maintaining said receiver adjusted to translate said direction indicating signals provided by said at least one transmitter only while a navigational parameter of said aircraft falls within a predetermined range of values of said navigational parameter.

22. A system for guiding a craft with respect to a selected one of a plurality of radio beacons, comprising, means for transmitting from each beacon predetermined discrete pulse signals of different repetition rates, means for receiving at said craft energy from said beacon stations, means for selecting from said received energy one of said signals selected in accordance with its pulse repetition rate, and means for providing a directive signal indication in response to said selected one of said signals.

23. In combination, a radio receiver aboard an aircraft, means aboard said aircraft for measuring altitude of said aircraft, means responsive to said last means for tuning said receiver to receive carrier waves within only a relatively narrow sub-band of frequencies corresponding with altitude of said aircraft, said sub-band of frequencies included in a relatively wide band of frequencies each of which corresponds with a possible altitude of said aircraft, a carrier wave transmitter remote from said receiver, and means for tuning said transmitter to transmit signals at a selected frequency within said relatively wide band of frequencies.

24. In a system for indicating a predetermined range of vertical levels along an airway, a plurality of transmitters installed along said airway, each transmitter having means for generating and transmitting pulse signals at a characteristic recurrence rate, means for varying a value of an information bearing characteristic of each of said signals in accordance with ambient atmospheric pressure, a receiver carried aboard an aircraft for receiving said signals, and means for selecting one of said received signals from said received signals in accordance with its pulse repetition rate.

25. A system for indicating predetermined vertical level along an airway, comprising, a plurality of transmitters installed along said airway, each transmitter having means for emitting direction significant signals having a carrier frequency representative of altitude and pulsed at a different characteristic repetition rate at each of said transmitters, a receiver carried on board an aircraft, said receiver having means for indicating visually the direction signified by said direction significant signals, means at said receiver for selecting a selected one of said direction significant signals in accordance with its pulse repetition rate, and means for automatically maintaining said receiver tuned to receive and indicate only certain of said signals selected in accordance with their carrier frequencies.

MARCEL WALLACE.

REFERENCES CITED

The following references are of record in the file of this patent:

UNITED STATES PATENTS

| Number | Name | Date |
|---|---|---|
| 1,989,086 | Diamond et al. | Jan. 29, 1935 |
| 2,007,076 | Cohn et al. | July 2, 1935 |
| 2,008,832 | Leonard | July 23, 1935 |
| 2,042,490 | Zahl | June 2, 1936 |
| 2,090,359 | Robinson | Aug. 17, 1937 |
| 2,097,072 | Lock | Oct. 26, 1937 |
| 2,248,215 | Budenbom | July 8, 1941 |
| 2,279,246 | Podliasky et al. | Apr. 7, 1942 |
| 2,287,786 | Diamond et al. | June 30, 1942 |
| 2,361,956 | Moseley | Nov. 7, 1944 |
| 2,378,604 | Wallace | June 19, 1945 |
| 2,400,232 | Hall | May 14, 1946 |
| 2,448,016 | Busignies | Aug. 31, 1948 |